US012237895B2

(12) United States Patent
Sun et al.

(10) Patent No.: US 12,237,895 B2
(45) Date of Patent: Feb. 25, 2025

(54) CHANNEL STATE INFORMATION (CSI) FOR UNLICENSED SPECTRUM

(71) Applicant: QUALCOMM Incorporated, San Diego, CA (US)

(72) Inventors: Jing Sun, San Diego, CA (US); Ananta Narayanan Thyagarajan, Bangalore (IN); Xiaoxia Zhang, San Diego, CA (US); Kapil Bhattad, Bangalore (IN); Pravjyot Singh Deogun, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/922,916

(22) Filed: Jul. 7, 2020

(65) Prior Publication Data

US 2021/0013941 A1 Jan. 14, 2021

(30) Foreign Application Priority Data

Jul. 9, 2019 (IN) .............................. 201941027431
Aug. 12, 2019 (IN) .............................. 201941032560
Aug. 16, 2019 (IN) .............................. 201941033077

(51) Int. Cl.
*H04B 7/06* (2006.01)
*H04L 5/00* (2006.01)
(Continued)

(52) U.S. Cl.
CPC ......... *H04B 7/0626* (2013.01); *H04L 5/0051* (2013.01); *H04W 72/23* (2023.01); *H04W 72/53* (2023.01)

(58) Field of Classification Search
CPC ..... H04W 76/15; H04W 24/08; H04W 76/20; H04W 76/30; H04W 72/04;
(Continued)

(56) References Cited

U.S. PATENT DOCUMENTS

2013/0028182 A1\* 1/2013 Geirhofer ............. H04L 1/0687
370/328
2014/0044040 A1\* 2/2014 Chen .................... H04L 5/0094
370/328
(Continued)

FOREIGN PATENT DOCUMENTS

CN 109644034 A 4/2019
WO 2012124552 A1 9/2012
(Continued)

OTHER PUBLICATIONS

International Search Report and Written Opinion—PCT/US2020/041160—ISA/EPO—Dec. 7, 2020.
(Continued)

*Primary Examiner* — Yee F Lam
(74) *Attorney, Agent, or Firm* — Harrity & Harrity, LLP

(57) ABSTRACT

This disclosure provides systems, methods, and apparatuses for the identification of a channel state information reference signal (CSI-RS) resource. In some aspects, a UE that receives the CSI-RS may determine CSI feedback based at least in part on the CSI-RS after detecting the CSI-RS resource that includes the CSI-RS. Signaling or techniques for when no CSI-RS is detected (such as when the base station fails a channel access operation for all available CSI-RS resources) are also provided. Furthermore, approaches for rate matching for a shared channel around CSI-RS resources or for CSI interference management (CSI-IM) resources are provided, as well as CSI reporting approaches for cases when the UE fails to transmit CSI feedback due to a failed channel access operation, such as a triggered or re-triggered CSI report.

33 Claims, 10 Drawing Sheets

(51) Int. Cl.
*H04W 72/23* (2023.01)
*H04W 72/53* (2023.01)

(58) Field of Classification Search
CPC .... H04W 72/042; H04W 24/10; H04L 5/005; H04L 5/001; H04L 5/0094; H04L 1/0026; H04L 5/0053; H04B 7/0469; H04B 7/0695; H04B 7/065; H04B 7/088; H04B 7/0478

See application file for complete search history.

(56) References Cited

U.S. PATENT DOCUMENTS

| | | | | |
|---|---|---|---|---|
| 2014/0153427 | A1* | 6/2014 | Seo | H04L 1/20 370/252 |
| 2014/0269368 | A1* | 9/2014 | Xu | H04W 24/00 370/252 |
| 2014/0286176 | A1* | 9/2014 | Ro | H04W 36/0094 370/242 |
| 2014/0321313 | A1* | 10/2014 | Seo | H04J 11/0056 370/252 |
| 2015/0003347 | A1* | 1/2015 | Ko | H04L 5/0055 370/329 |
| 2015/0029964 | A1* | 1/2015 | Seo | H04L 5/001 370/329 |
| 2016/0094374 | A1* | 3/2016 | Koorapaty | H04W 72/042 370/329 |
| 2016/0227548 | A1 | 8/2016 | Nimbalker et al. | |
| 2016/0277081 | A1* | 9/2016 | Wei | H04L 5/0057 |
| 2017/0047976 | A1* | 2/2017 | Noh | H04B 7/0695 |
| 2017/0180194 | A1 | 6/2017 | Noh et al. | |
| 2017/0331535 | A1* | 11/2017 | Wei | H04B 7/0456 |
| 2018/0007731 | A1* | 1/2018 | Park | H04W 76/15 |
| 2018/0198499 | A1* | 7/2018 | Park | H04B 7/06 |
| 2018/0219603 | A1* | 8/2018 | Park | H04B 7/0478 |
| 2018/0219606 | A1 | 8/2018 | Ng et al. | |
| 2018/0227106 | A1* | 8/2018 | Kim | H04L 1/00 |
| 2018/0241532 | A1* | 8/2018 | Kakishima | H04W 24/10 |
| 2018/0351621 | A1* | 12/2018 | Wei | H04B 7/0632 |
| 2019/0028158 | A1* | 1/2019 | Park | H04B 7/0478 |
| 2019/0098523 | A1* | 3/2019 | Muruganathan | H04L 5/005 |
| 2019/0098638 | A1* | 3/2019 | Kakishima | H04L 5/0094 |
| 2019/0173554 | A1* | 6/2019 | Kwak | H04B 7/0639 |
| 2019/0215131 | A1* | 7/2019 | Yoon | H04L 5/0053 |
| 2019/0319739 | A1* | 10/2019 | Kang | H04B 7/0617 |
| 2019/0341981 | A1* | 11/2019 | Park | H04B 7/0417 |
| 2020/0084794 | A1* | 3/2020 | Zhang | H04W 72/121 |
| 2020/0178220 | A1* | 6/2020 | Kang | H04L 5/0053 |
| 2020/0304260 | A1* | 9/2020 | Si | H04L 5/0048 |
| 2020/0366351 | A1* | 11/2020 | Karjalainen | H04B 7/0626 |
| 2021/0105111 | A1* | 4/2021 | Yoon | H04W 24/08 |
| 2021/0211225 | A1* | 7/2021 | Yuan | H04L 1/0026 |
| 2022/0287094 | A1* | 9/2022 | Tooher | H04L 5/005 |

FOREIGN PATENT DOCUMENTS

| | | | | |
|---|---|---|---|---|
| WO | WO-2018186647 A1 * | 10/2018 | | H04B 7/0626 |
| WO | 2018209596 A1 | 11/2018 | | |
| WO | WO-2019028760 A1 * | 2/2019 | | H04L 5/0048 |
| WO | 2019056298 A1 | 3/2019 | | |
| WO | 2019057073 A1 | 3/2019 | | |
| WO | WO-2019097356 A1 * | 5/2019 | | H04L 27/2611 |

OTHER PUBLICATIONS

Nokia, et al., "RLM/RLF Measurement on NR-U," 3GPP Draft, 3GPP TSG-RAN WG2 Meeting #106, R2-1906747, RLM RLF Measurement On NR-U, 3rd Generation Partnership Project (3GPP), Mobile Competence Centre, 650, Route Des Lucioles, F-06921, Sophia-Antipolis Cedex, France, vol. RAN WG2, No. Reno, Nevada, US, May 13, 2019-May 17, 2019, May 13, 2019 (May 13, 2019), XP051730203, 4 pages, Retrieved from the Internet: URL: http://www.3gpp.org/ftp/Meetings%5F3GPP%5FSYNC/RAN2/Docs/R2%2D1906747%2Ezip [retrieved on May 13, 2019], the whole document.

Partial International Search Report—PCT/US2020/041160—ISA/EPO—Oct. 14, 2020.

QUALCOMM Incorporated: "CSI Measurement and Reporting in LAA," 3GPP Draft, 3GPP TSG RAN WG1 #83, R1-157049, CSI Measurement and Reporting in LAA, 3rd Generation Partnership Project (3GPP), Mobile Competence Centre, 650, Route Des Lucioles, F-06921, Sophia-Antipolis Cedex, France, vol. RAN WG1. No. Anaheim, USA; Nov. 14, 2015-Nov. 22, 2015, Nov. 15, 2015 (Nov. 15, 2015), XP051003351, pp. 1-3, Retrieved from the Internet: URL: http://www.3gpp.org/ftp/Meetings_3GPP_SYNC/RAN1/Docs/ [retrieved on Nov. 15, 2015] the whole document.

Samsung: "LAA CSI Reporting", 3GPP Draft, 3GPP TSG RAN WG1 Meeting #83, R1-156772_LAA CSI Reporting, 3rd Generation Partnership Project (3GPP), Mobile Competence Centre ; 650, Route Des Lucioles ; F-06921 Sophia-Antipolis Cedex; France, vol. RAN WG1, No. Anaheim, USA; Nov. 15, 2015-Nov. 22, 2015, Nov. 7, 2015 (Nov. 7, 2015), XP051022496, 4 Pages, Retrieved from the Internet: URL:http://www.3gpp.org/ftp/tsg_ran/WG1_RL1/TSGR1_83/Docs/ [retrieved on Nov. 7, 2015].

* cited by examiner

CHANNEL STATE INFORMATION (CSI) FOR UNLICENSED SPECTRUM

CROSS-REFERENCE TO RELATED APPLICATIONS

This Patent Application claims priority to Indian Provisional Patent Application No. 201941027431 filed Jul. 9, 2019, Indian Provisional Patent Application No. 201941032560 filed Aug. 12, 2019, and Indian Provisional Patent Application No. 201941033077, filed Aug. 16, 2019, all of which are entitled "CHANNEL STATE INFORMATION FOR UNLICENSED SPECTRUM" and assigned to the assignee hereof. The disclosures of the prior Applications are considered part of and are incorporated by reference in this Patent Application.

TECHNICAL FIELD

Aspects of the present disclosure relate generally to wireless communication and to techniques for channel state information (CSI) feedback in the unlicensed spectrum.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB, or the like.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by a user equipment (UE). The method may include receiving configuration information for a channel state information reference signal (CSI-RS), where the configuration information indicates a plurality of CSI-RS resources; determining whether the CSI-RS is received on the plurality of CSI-RS resources based on the configuration information; and selectively transmitting a CSI report based on whether the CSI-RS is received.

In some implementations, determining whether the CSI-RS is received further includes identifying a CSI-RS resource, of the plurality of CSI-RS resources, on which the CSI-RS is received based on a measurement of the plurality of CSI-RS resources.

In some implementations, determining whether the CSI-RS is received further includes identifying a CSI-RS resource, of the plurality of CSI-RS resources, on which the CSI-RS is received based on the CSI-RS resource being associated with a measurement value that satisfies a threshold.

In some implementations, the CSI-RS resource is an earliest CSI-RS resource, of the plurality of CSI-RS resources, that is associated with the measurement value that satisfies the threshold.

In some implementations, determining whether the CSI-RS is received is based on decoding information indicating that a CSI-RS resource, of the plurality of CSI-RS resources, is included in a transmit opportunity (TXOP).

In some implementations, the method may include determining whether the CSI-RS is received based on the information indicating the CSI-RS resource.

In some implementations, the plurality of CSI-RS resources are associated with a tracking reference signal (TRS) burst, where the TRS burst is received when all CSI-RS resources, of the plurality of CSI-RS resources, are included in a transmit opportunity of a base station that transmits the TRS burst.

In some implementations, when the CSI-RS is not received, selectively transmitting the CSI report further includes skipping transmission of the CSI report.

In some implementations, when the CSI-RS is not received, the CSI report relates to a CSI-RS received before a time associated with the plurality of CSI-RS resources.

In some implementations, when the CSI-RS is not received, the CSI report indicates that the CSI-RS is not received.

In some implementations, the CSI report is transmitted with information identifying at least one of: an indication of which CSI-RS resource is associated with the CSI report, an indication of a CSI period associated with the CSI report, or an indication of whether the CSI report is valid.

In some implementations, the method may include receiving a grant for a shared channel that overlaps at least one CSI-RS resource of the plurality of CSI-RS resources, and rate matching the shared channel around the at least one CSI-RS resource.

In some implementations, the at least one CSI-RS resource is for a zero-power CSI-RS, and rate matching the shared channel around the at least one CSI-RS resource further includes rate matching the shared channel around one or more CSI-RS resources that overlap the shared channel.

In some implementations, the at least one CSI-RS resource is for a zero-power CSI-RS, and rate matching the shared channel around the at least one CSI-RS resource further includes rate matching the shared channel around a first CSI-RS resource, of the at least one CSI-RS resource, that is included in a transmit opportunity.

In some implementations, the grant includes an indication of whether to rate match the shared channel around the at least one CSI-RS resource.

In some implementations, the method may include receiving a trigger for a retransmission of the CSI report, where the trigger identifies the CSI report and where the CSI report is a periodic CSI report or a semi-persistent CSI report. The method may include performing the retransmission of the CSI report in accordance with the trigger.

In some implementations, the trigger includes an indication that the trigger is an aperiodic retransmission trigger for the CSI report.

In some implementations, the trigger includes an indication of at least one of an index to a CSI report configuration or an index to a CSI-RS resource configuration for which the retransmission of the CSI report is to be triggered.

In some implementations, the trigger includes an indication of at least one of a slot index of the CSI report or a slot index of a CSI-RS resource, of the plurality of CSI-RS resources, on which the CSI-RS was received.

In some implementations, the trigger includes an indication of at least one of: an uplink resource for the retransmission of the CSI report, encoding information for the retransmission of the CSI report, or a channel access type for the retransmission of the CSI report.

In some implementations, the trigger includes an indication of whether the CSI report for which the retransmission is triggered is an aperiodic CSI report, a periodic CSI report, or a semi-persistent CSI report.

In some implementations, the trigger identifies the CSI report for which the retransmission is triggered.

In some implementations, performing the retransmission of the CSI report in accordance with the trigger further includes performing the retransmission based on a maximum time limit between the trigger and a previous trigger for the CSI report.

In some implementations, determining whether the CSI-RS is received includes identifying a CSI-RS resource, of the plurality of CSI-RS resources, on which the CSI-RS is received based at least in part on the CSI-RS resource having a signal strength value that satisfies a threshold. In some implementations, the signal strength value can be a maximum signal strength value. In some implementations, Out-Of-Sync and In-Sync metrics can be determined when the signal strength value satisfies the threshold.

Another innovative aspect of the subject matter described in this disclosure can be implemented in a UE for wireless communication. The UE may include memory and one or more processors operatively coupled to the memory. The memory and the one or more processors may be configured to receive configuration information indicating a plurality of CSI-RS resources for a CSI-RS; determine whether the CSI-RS is received on the plurality of CSI-RS resources; and selectively transmit a CSI report based at least in part on the CSI-RS.

Another innovative aspect of the subject matter described in this disclosure can be implemented in an apparatus for wireless communication. The apparatus may include a first interface configured to obtain configuration information for a CSI-RS, where the configuration information indicates a plurality of CSI-RS resources; a processing system configured to determine whether the CSI-RS is received on the plurality of CSI-RS resources based on the configuration information; and a second interface configured to selectively output a CSI report based on whether the CSI-RS is received.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive configuration information for a CSI-RS, where the configuration information indicates a plurality of CSI-RS resources; determine whether the CSI-RS is received on the plurality of CSI-RS resources based on the configuration information; and selectively transmit a CSI report based on whether the CSI-RS is received.

Another innovative aspect of the subject matter described in this disclosure can be implemented in an apparatus for wireless communication. The apparatus may include means for receiving configuration information for a CSI-RS, where the configuration information indicates a plurality of CSI-RS resources; means for determining whether the CSI-RS is received on the plurality of CSI-RS resources based on the configuration information; and means for selectively transmitting a CSI report based on whether the CSI-RS is received.

Another innovative aspect of the subject matter described in this disclosure can be implemented in a method of wireless communication performed by a base station (BS). The method may include transmitting configuration information for a CSI-RS, where the configuration information indicates a plurality of CSI-RS resources; selectively transmitting the CSI-RS on a selected CSI-RS resource, of the plurality of CSI-RS resources, where the selected CSI-RS resource is based on a channel access operation and the configuration information; and selectively receiving a CSI report based on the CSI-RS.

In some implementations, the method may include transmitting information indicating that the selected CSI-RS resource of the CSI-RS is included in the transmit opportunity based on a success of the channel access operation.

In some implementations, the method may include transmitting information indicating the selected CSI-RS resource.

In some implementations, the plurality of CSI-RS resources are associated with a tracking reference signal (TRS) burst, and the TRS burst is transmitted only when all CSI-RS resources, of the plurality of CSI-RS resources, are included in a TXOP of the base station.

In some implementations, when the CSI-RS is not transmitted based on a failure of the channel access operation, the CSI report is not received.

In some implementations, when the CSI-RS is not transmitted, the CSI report relates to a CSI-RS transmitted before the plurality of CSI-RS resources.

In some implementations, when the CSI-RS is not transmitted, the CSI report indicates that the CSI-RS is not received by a user equipment.

In some implementations, the CSI report is received with information identifying at least one of: an indication of which CSI-RS resource is associated with the CSI report, an indication of a CSI period associated with the CSI report, or an indication of whether the CSI report is valid.

In some implementations, the method may include transmitting a grant for a shared channel that overlaps at least one CSI-RS resource of the plurality of CSI-RS resources, and rate match the shared channel around the at least one CSI-RS resource.

In some implementations, the at least one CSI-RS resource is for a zero-power CSI-RS. Rate matching the shared channel around the at least one CSI-RS resource may further include rate matching the shared channel around one or more CSI-RS resources that overlap the shared channel.

In some implementations, the at least one CSI-RS resource is for a zero-power CSI-RS. In some aspects, rate matching the shared channel around the at least one CSI-RS resource may further include rate matching the shared channel around a first CSI-RS resource of the at least one CSI-RS resource that is included in a transmit opportunity.

In some implementations, the grant includes an indication of whether to rate match the shared channel around the at least one CSI-RS resource.

In some implementations, the method may include transmitting a trigger for a retransmission of the CSI report, where the trigger identifies the CSI report and where the CSI report is a periodic CSI report or a semi-persistent CSI report. The method may include receiving the retransmission of the CSI report in accordance with the trigger.

In some implementations, the trigger includes an indication that the trigger is an aperiodic retransmission trigger for the CSI report.

In some implementations, the trigger includes an indication of at least one of an index to a CSI report configuration or an index to a CSI-RS resource configuration for which the retransmission of the CSI report is to be triggered.

In some implementations, the trigger includes an indication of at least one of a slot index of the CSI report or a slot index of a CSI-RS resource, of the plurality of CSI-RS resources, on which the CSI-RS was received.

In some implementations, the trigger includes an indication of at least one of: an uplink resource for the retransmission of the CSI report, encoding information for the retransmission of the CSI report, or a channel access type for the retransmission of the CSI report.

In some implementations, the trigger includes an indication of whether the CSI report for which the retransmission is triggered is an aperiodic CSI report, a periodic CSI report, or a semi-persistent CSI report.

In some implementations, the trigger identifies the CSI report for which the retransmission is triggered.

In some implementations, the trigger is transmitted based on a maximum time limit between the trigger and a previous trigger for the CSI report.

Another innovative aspect of the subject matter described in this disclosure can be implemented in a BS for wireless communication. The BS may include memory and one or more processors operatively coupled to the memory. The memory and the one or more processors may be configured to transmit configuration information indicating a plurality of CSI-RS resources for a CSI-RS; selectively transmit the CSI-RS on a selected CSI-RS resource, of the plurality of CSI-RS resources, where the selected CSI-RS resource is based at least in part on a channel access operation; and selectively receive a CSI report based at least in part on whether the CSI-RS is received.

Another innovative aspect of the subject matter described in this disclosure can be implemented in an apparatus for wireless communication. The apparatus may include a first interface configured to output configuration information for a CSI-RS, where the configuration information indicates a plurality of CSI-RS resources; and selectively output the CSI-RS on a selected CSI-RS resource, of the plurality of CSI-RS resources, where the selected CSI-RS resource is based on a channel access operation and the configuration information. The apparatus may include a second interface configured to selectively obtain a CSI report based on whether the CSI-RS is received.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to transmit configuration information for a CSI-RS, where the configuration information indicates a plurality of CSI-RS resources; selectively transmit the CSI-RS on a selected CSI-RS resource, of the plurality of CSI-RS resources, where the selected CSI-RS resource is based on a channel access operation and the configuration information; and selectively receive a CSI report based on the CSI-RS.

Another innovative aspect of the subject matter described in this disclosure can be implemented in an apparatus for wireless communication. The apparatus may include means for transmitting configuration information for a CSI-RS, where the configuration information indicates a plurality of CSI-RS resources; means for selectively outputting the CSI-RS on a selected CSI-RS resource, of the plurality of CSI-RS resources, where the selected CSI-RS resource is based on a channel access operation and the configuration information; and means for selectively obtaining a CSI report based on whether the CSI-RS is received.

Aspects generally include a method, apparatus, system, computer program product, non-transitory computer-readable medium, user equipment, base station, wireless communication device, or processing system as substantially described with reference to and as illustrated by the drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
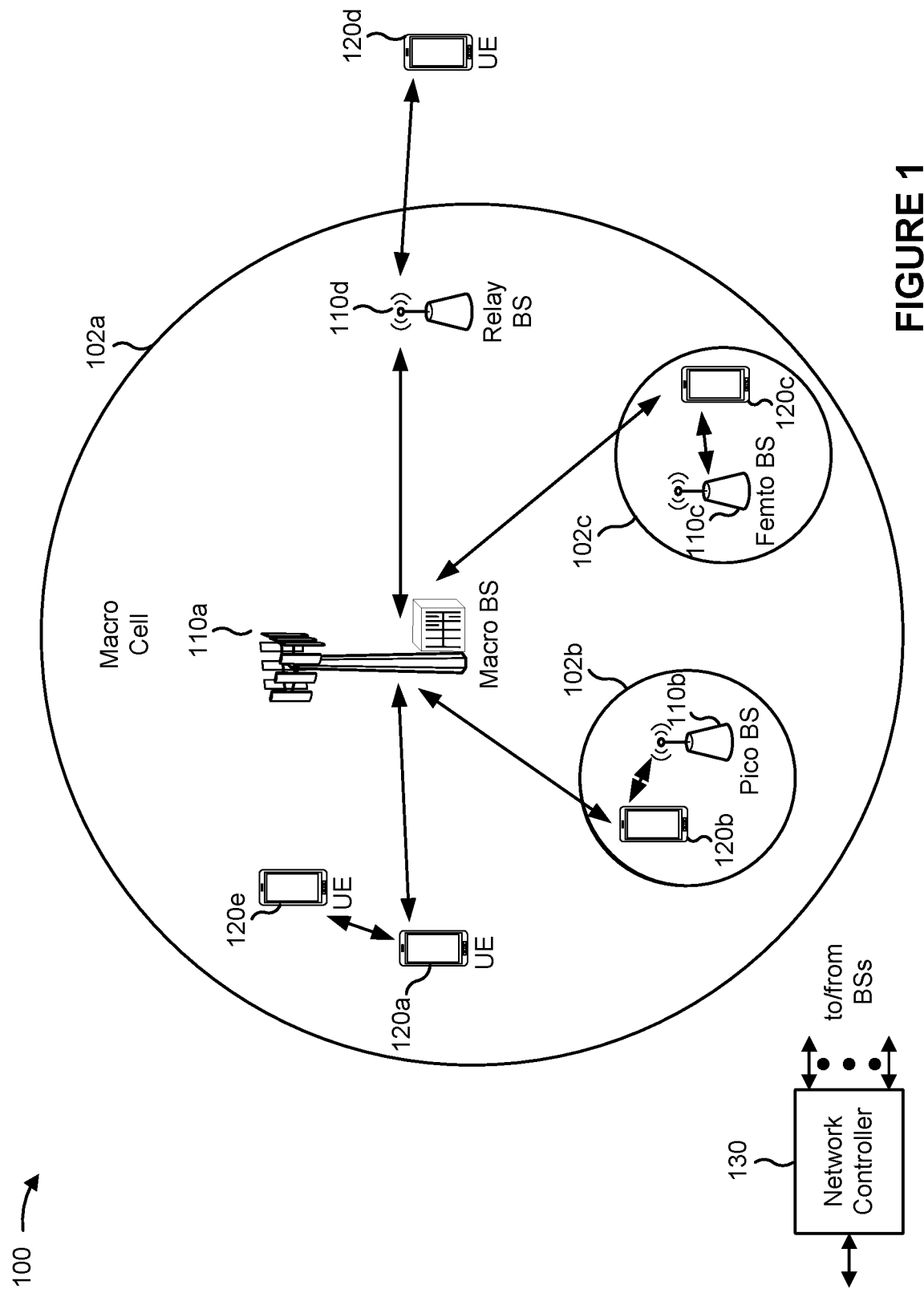
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (TOT) network, such as a system utilizing 3G, 4G or 5G, or further implementations thereof, technology.

Some radio access technologies (RATs), such as NR, may allow operation in unlicensed spectrum. The NR RAT for the unlicensed spectrum may be referred to as NR-Unlicensed (NR-U). Not all sub-bands in unlicensed spectrum may be available at all times. For example, some sub-bands may be occupied by other UEs, base stations, or wireless nodes. A base station or a UE may perform a channel access operation to determine whether one or more sub-bands are available for a communication. In a channel access operation, a base station or UE may listen to a channel or a sub-band for a length of time, then may transmit an indication that the base station or UE has reserved the channel or the sub-band for a time window if no other reservation for the channel or the sub-band is received while listening or if interference on the channel or the sub-band satisfies a threshold. Thus, coexistence between devices on non-centrally-scheduled channels, such as sidelink channels on the unlicensed spectrum, is enabled.

A base station may use channel state information (CSI) feedback to determine channel conditions for a channel between the base station and a UE. For example, the base station may transmit a CSI-RS to one or more UEs with certain characteristics that may be available to, or determinable by, the UE. Using the CSI-RS, the UE may determine appropriate CSI feedback, such as a CSI report, which may indicate the channel conditions between the base station and the UE. In some implementations, the term "CSI report" can be used interchangeably with "CSI feedback". However, in the case of unlicensed spectrum, either or both of the CSI-RS transmission or the CSI report transmission may fail due to a failed channel access operation. A single-shot CSI-RS or CSI feedback approach may not be sufficiently robust for unpredictable unlicensed spectrum. Furthermore, certain operations, such as rate matching around some types of CSI-RS, may be hampered by this uncertainty.

Techniques and apparatuses described herein provide for the identification of a CSI-RS resource, of a plurality of CSI-RS resources, in which a CSI-RS has been transmitted. For example, a UE may identify a CSI-RS resource in which a CSI-RS is transmitted, or may determine whether a CSI-RS has been transmitted on a CSI-RS resource, using various techniques described herein. The UE may determine particular CSI feedback (which may include a CSI report) if the CSI-RS is detected on the CSI-RS resource. Some techniques and apparatuses described herein provide signaling or techniques for when no CSI-RS is detected (such as when the base station fails a channel access operation for all available CSI-RS resources). Some techniques and apparatuses described herein provide approaches for rate matching around CSI-RS resources or CSI interference management (CSI-IM) resources. Some techniques and apparatuses described herein provide CSI reporting approaches for cases when the UE fails to transmit CSI feedback due to a failed channel access operation, such as a triggered or re-triggered CSI reporting approach. Furthermore, some techniques and apparatuses described herein provide a tracking reference signal (TRS) configuration for shared spectrum scenarios.

Particular implementations of the subject matter described in this disclosure can be implemented to realize one or more of the following potential advantages. By providing more robust CSI-RS transmission and CSI reporting, throughput and channel access performance in unlicensed spectrum may be improved, particularly in more densely populated unlicensed spectrum scenarios. Thus, communications between the BS and the UE may be made more robust when medium is shared, by configuring multiple occasions in a period to mitigate channel access-related failures. Furthermore, efficient and robust utilization of the medium given the opportunistic channel access in unlicensed spectrum may be possible. Still further, the techniques described herein may mitigate performance degradation due to slow channel adaptation associated with channel access-related delays in channel state feedback. By providing more robust tracking reference signal (TRS) in shared spectrum scenarios, the communication and synchronization performance between the BS and UE may be improved.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 watts) whereas pico BSs, femto BSs, and relay BSs may have lower transmit power levels (for example, 0.1 to 2 watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120*a*, 120*b*, 120*c*) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
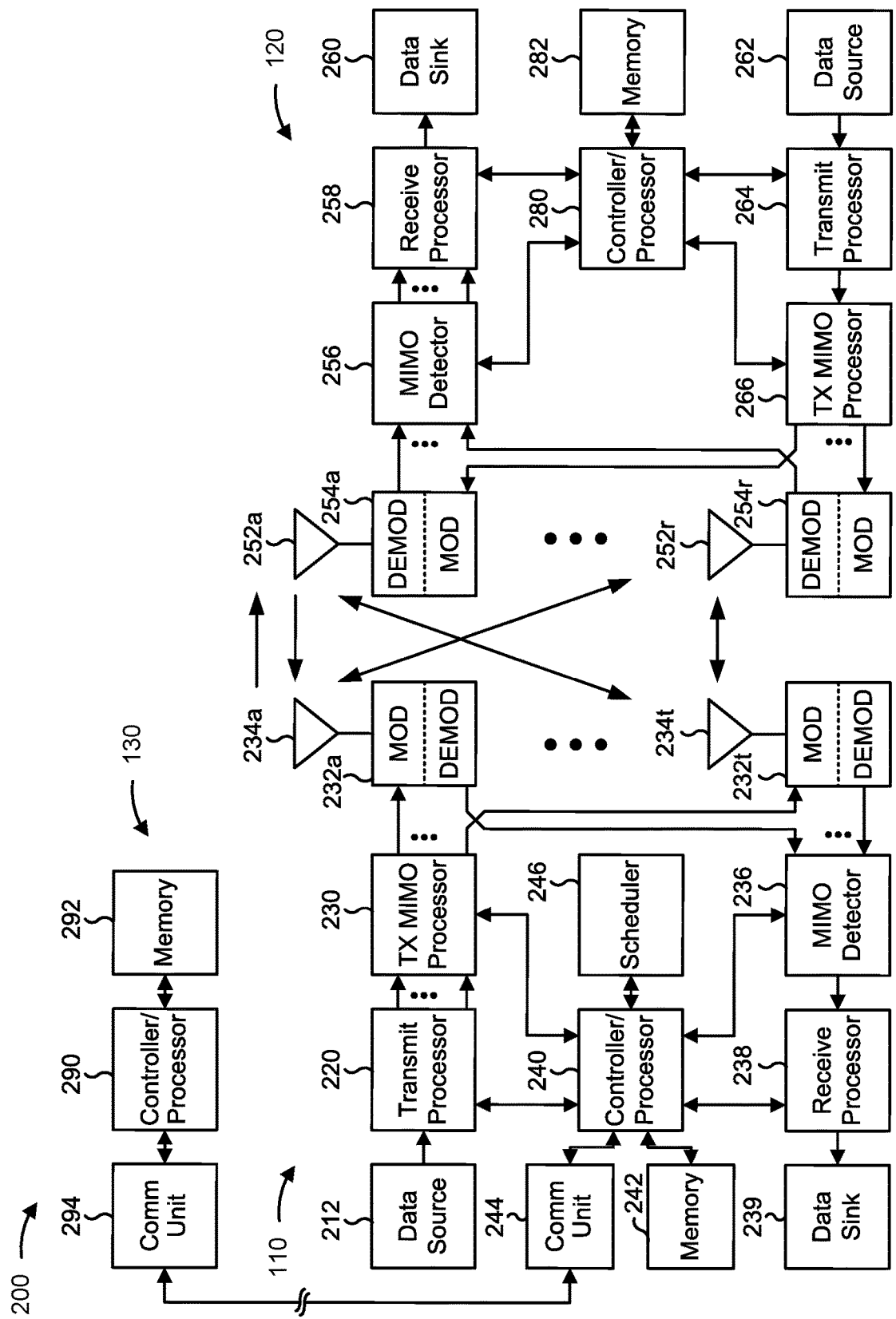
FIG. 2 is a block diagram conceptually illustrating an example of a base station (BS) in communication with a user equipment (UE) in a wireless network.

FIG. 2 is a block diagram conceptually illustrating an example 200 of a base station (BS) 110 in communication with a user equipment (UE) 120. In some aspects, the base station 110 and the UE 120 may respectively be one of the base stations and one of the UEs in wireless network 100 of FIG. 1. The base station 110 may be equipped with T antennas 234a through 234t, and the UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

In some implementations, controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface configured to receive or obtain information, and a second interface configured to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 240 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface configured to receive or obtain information, and a second interface configured to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

The controller/processor 240 of base station 110, the controller/processor 280 of UE 120, or any other component(s) of FIG. 2 may perform one or more techniques associated with CSI feedback in the unlicensed spectrum, as described in more detail elsewhere herein. For example, the controller/processor 240 of base station 110, the controller/processor 280 of UE 120, or any other component(s) (or combinations of components) of FIG. 2 may perform or direct operations of, for example, process 900 of FIG. 9, process 1000 of FIG. 10, or other processes as described herein. The memories 242 and 282 may store data and program codes for base station 110 and UE 120, respectively. A scheduler 246 may schedule UEs for data transmission on the downlink, the uplink, or a combination thereof.

Figure 9:
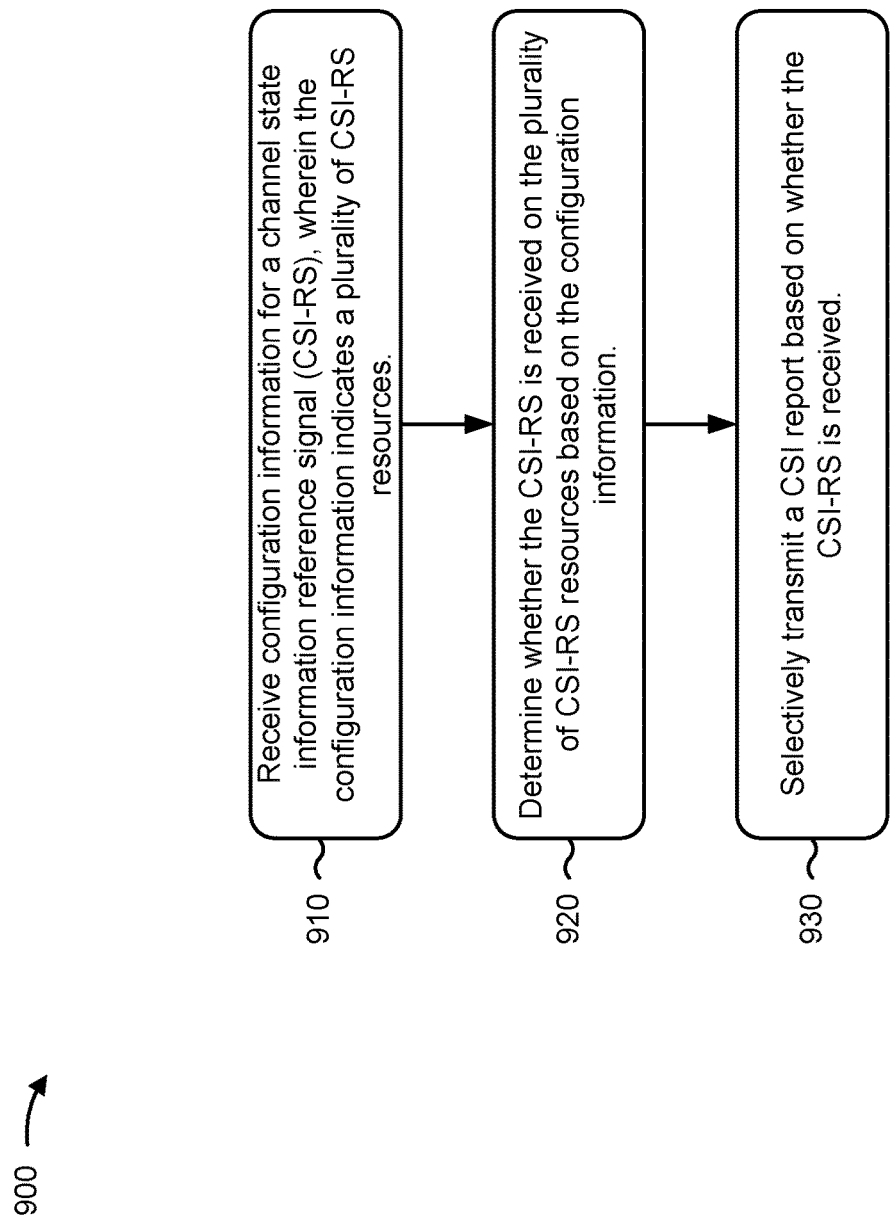
FIG. 9 is a diagram illustrating an example process performed, for example, by a UE.

The stored program codes, when executed by the controller/processor 280 or other processors and modules at UE 120, may cause the UE 120 to perform operations described with respect to process 900 of FIG. 9 or other processes as described herein. The stored program codes, when executed by the controller/processor 240 or other processors and modules at base station 110, may cause the base station 110 to perform operations described with respect to process 1000 of FIG. 10 or other processes as described herein. A scheduler 246 may schedule UEs for data transmission on the downlink, the uplink, or a combination thereof.

The UE 120 may include means for performing one or more operations described herein, such as the process 900 of FIG. 9 or other processes as described herein. In some aspects, such means may include one or more components of UE 120 described in connection with FIG. 2. The base station 110 may include means for performing one or more operations described herein, such as the process 1000 of FIG. 10 or other processes as described herein. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
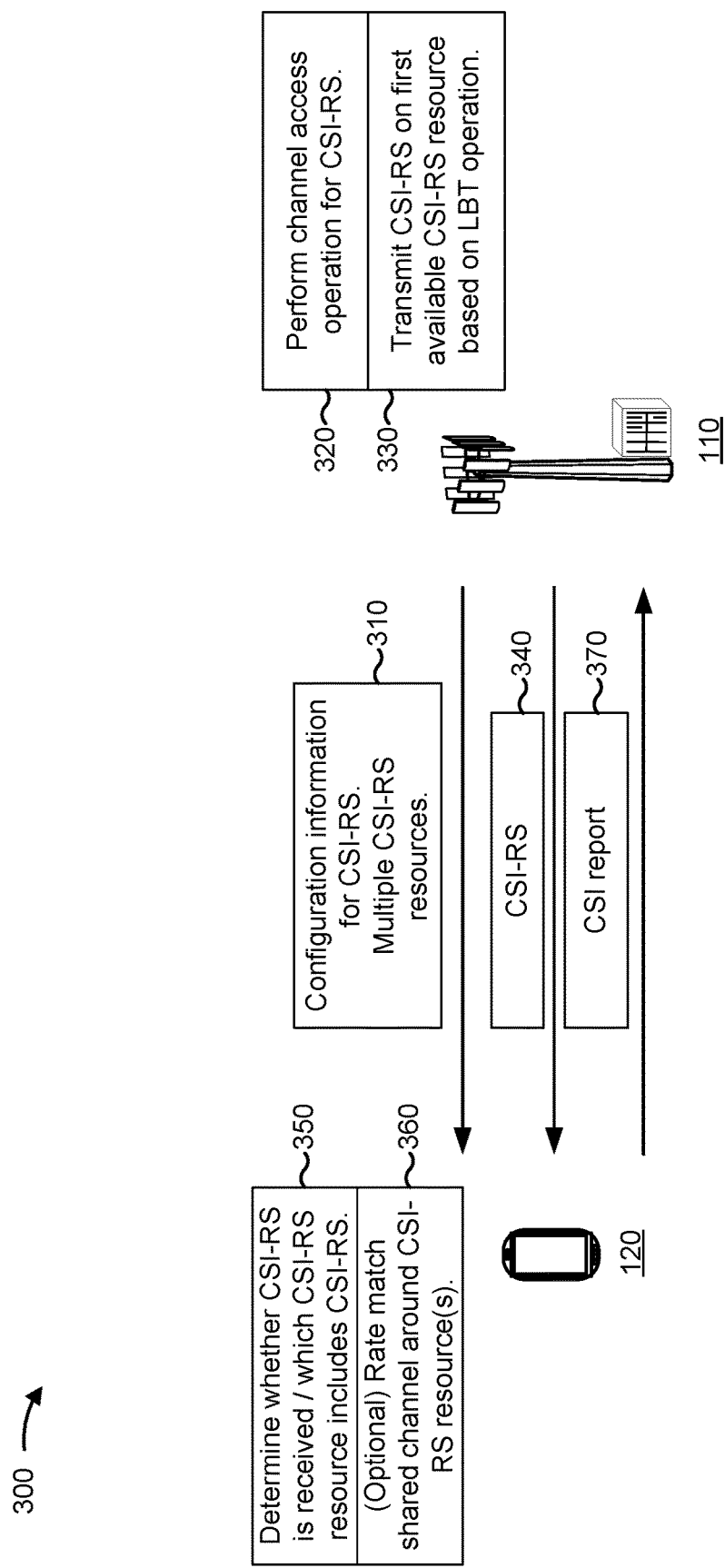
FIG. 3 is a diagram illustrating an example of channel state information (CSI) reporting in an unlicensed spectrum.

FIG. 3 is a diagram illustrating an example 300 of channel state information (CSI) reporting in an unlicensed spectrum. As shown, example 300 includes a UE 120 and a BS 110.

As shown by reference number 310, the BS 110 may transmit configuration information for a CSI-RS to the UE 120. The configuration information for the CSI-RS may identify multiple CSI-RS resources on which the CSI-RS may be transmitted, a CSI-RS periodicity, one or more slot offsets for resource allocations for the multiple CSI-RS resources, whether the CSI-RS is periodic, aperiodic, or semi-persistent, or other information. In some aspects, the configuration information may identify CSI reporting information, such as a periodicity of the CSI report, a slot offset of the CSI report, uplink frequency resources for the CSI report, whether the CSI report is periodic, aperiodic, or semi-persistent, or other information.

As shown by reference number 320, the BS 110 may perform a channel access operation to identify a transmit opportunity for the CSI-RS. "Transmit opportunity" is sometimes abbreviated as "TXOP" in the accompanying drawings. The BS 110 may perform the channel access operation to identify which CSI-RS resource, of multiple configured CSI-RS resources, is available for transmission of the CSI-RS. If the channel access operation is successful, then the BS 110 may transmit the CSI-RS on the first available CSI-RS resource in a transmit opportunity identified by the channel access operation, and may cancel subsequent CSI-RS resources. If the channel access operation is not successful, then the BS 110 may perform a subsequent channel access operation to identify another configured CSI-RS resource on which the CSI-RS can be transmitted. In some cases, no CSI-RS resource may be available (or, in other words, all channel access operations performed by the BS 110 may fail). In that case, the BS 110 may not transmit a CSI-RS in the CSI-RS period.

The BS 110 may configure multiple CSI-RS resources, and the slot offset for the multiple CSI-RS resources may be based on the CSI-RS periodicity of the CSI-RS. For example, a longer periodicity may be associated with more CSI-RS resources (denoting a larger number of slot offsets, where each CSI-RS resource is associated with a respective slot offset). In some aspects, each CSI-RS resource may be associated with a respective CSI reporting configuration, such as a respective physical uplink control channel. For example, the CSI resource configuration radio resource control value may identify multiple slot offsets, associated with respective CSI-RS resources, for each CSI-RS period. In some cases, the number of slot offsets in a period can depend on the period. For example, a longer period may be associated with a larger number of slot offsets. In some aspects, multiple P/SP CSI-RS resource sets may be provided in a CSI-RS resource configuration. In such implementations, the first channel access successful resource may be used in a period, and the other P/SP CSI-RS resource sets of the multiple P/SP CSI-RS resource sets may be ignored. This first transmitted CSI-RS can be inside or outside the channel occupancy time (COT) of the BS 110.

As shown by reference number 330, the BS 110 may transmit the CSI-RS (shown by reference number 340) on a first available CSI-RS resource of the multiple CSI-RS resources identified by the configuration information. For example, the BS 110 may transmit the CSI-RS once the channel access operation is successful (such as on a first CSI-RS resource that is associated with a successful channel access result).

As shown by reference number 350, the UE 120 may determine whether the CSI-RS is received, or may determine which CSI-RS resource, of the multiple configured CSI-RS resources, was used for the CSI-RS.

In some aspects, the UE 120 may identify a periodic CSI-RS (P-CSI-RS) by measuring multiple P-CSI-RS resources in a CSI-RS period, and selecting the resource with the best measurement value (such as the best signal-to-noise ratio (SNR), the best reference signal received power, the best reference signal received quality, or a similar measurement). In some aspects, the UE 120 may select the first P-CSI-RS resource with a measurement value that satisfies a threshold (such as the SNR ratio measured being greater than the threshold). In some aspects, if no CSI-RS satisfies the threshold, then the UE 120 may determine that no valid CSI-RS is received. Furthermore, if a valid CSI-RS is detected in a given CSI-RS resource, the UE 120 may report a slot-offset or index of the given CSI-RS resource. In this case, if the BS 110 determines that the CSI-RS resource used by the UE 120 is invalid (or, in other words, that a CSI-RS was not transmitted on the CSI-RS resource), then the BS 110 may ignore the CSI report.

In some aspects, the UE 120 may use information indicating a transmit opportunity for the CSI-RS (such as a channel occupancy time (COT) structure indicator (SI), a physical downlink control channel (PDCCH), a synchronization signal block (SSB), or a similar indication of a transmit opportunity) to identify a resource on which a CSI-RS is received. For example, a CSI-RS may be transmitted inside the BS 110's COT (including the SSB or demodulation reference (DMRS) signal transmissions). A slot format indicator or COT-SI received by the UE 120 can be used to determine if a CSI-RS resource is inside the COT and in downlink symbols of the COT. For example, if the CSI-RS resource is outside of the COT, the BS 110 likely did not use the CSI-RS resource to transmit the CSI-RS, so the UE 120 may determine that the CSI-RS was not received on that CSI-RS resource. If the UE 120 does not detect a COT or a transmit opportunity, then the UE 120 may determine that no CSI-RS was transmitted on the CSI-RS resource, or may use a measurement-threshold-based approach to determine whether a CSI-RS was transmitted on the CSI-RS resource.

In some implementations, the BS 110 may trigger an aperiodic CSI-RS transmission by a downlink control information (DCI) inside a COT. In such implementations, the aperiodic CSI-RS transmission may be triggered if the CSI-RS can be transmitted inside the same COT. In some implementations, the UE 120 may determine that the aperiodic CSI-RS is received if it falls inside the same COT as the downlink control information (DCI) that triggered it, and additionally, or alternatively, if it falls in the downlink symbols of the COT.

In some aspects, the UE 120 may receive a physical downlink control channel (PDCCH), such as a common PDCCH or a UE-specific PDCCH, that explicitly indicates the presence or absence of a CSI-RS. For example, the UE 120 may receive a downlink grant or a COT-SI that includes an indication (such as a bit or a bitmap) indicating the presence or absence of a CSI-RS transmission.

In some aspects, the BS 110 may provide an indication of which CSI-RS resource was used to transmit the CSI-RS. For example, the BS 110 may provide an explicit indication, such as a common PDCCH or downlink with a bitmap that indicates one or more CSI-RS transmitted in a CSI-RS period. In some aspects, like in the case of an aperiodic CSI report request (such as for an already-transmitted P/SP CSI-RS), the BS 110 may transmit a bitmap indicating the CSI-RS.

In some aspects, the UE 120 may perform any combination of the techniques described herein for determining whether a CSI-RS was received. For example, the UE 120 may first determine whether an explicit indication of the CSI-RS resource is received, and if no explicit indication is received, the UE 120 may determine whether the CSI-RS is received using a measurement-based approach. In some aspects, the UE 120 may perform radio link monitoring based on the CSI-RS. For example, the radio link monitoring measurement of the UE 120 may use valid CSI-RS occasions that are identified using the above-described techniques.

For example, the UE 120 may be configured with multiple CSI-RS resources within a time period for radio link monitoring corresponding to a downlink beam. In some implementations, the UE 120 may measure one or more CSI-RS resources of the multiple CSI-RS resources within the time period and select the CSI-RS resource with a particular signal strength value. For example, and in some implementations based on the design of the receiver, the particular signal strength value may be a maximum signal strength value, such as a highest signal strength value of one or more signal strength values associated with the one or more measured CSI-RS resources. In some implementations, the UE 120 may use the signal strength of the selected CSI-RS resource for radio link monitoring and evaluation of the downlink beam. In such implementations, the UE 120 may use the signal strength of the selected CSI-RS resource to determine Out-Of-Sync or In-Sync metrics. In some other implementations, the UE 120 may perform a measurement procedure of one or more CSI-RS resources of the multiple CSI-RS resources within the time period, and may stop the measurement procedure once it determines a CSI-RS resource has a signal strength value greater than a threshold. In other words, the UE 120 can be implemented not to perform the measurement of the remaining CSI-RS resources within the time period. In some implementations, the threshold can be based on signal strength threshold used for In-Sync metric evaluation.

Once the CSI-RS resource is determined, the UE 120 may use the signal strength for radio link monitoring and evaluation of the downlink beam to determine Out-Of-Sync or In-Sync metrics. Alternatively, if the UE 120 is unable to determine a CSI-RS resource which has a signal strength greater than the threshold, then the UE 120 can be implemented to select the CSI-RS resource with the maximum signal strength value. In such a scenario, the UE 120 may use the signal strength of the selected CSI-RS resource for radio link monitoring and evaluation of the downlink beam to determine Out-Of-Sync or In-Sync metrics. Additionally, the UE 120 may perform a similar procedure for performing radio link monitoring using synchronization signal block (SSB) resources occurring within a discovery reference signal measurement timing configuration (DMTC) and corresponding to a downlink beam.

In some aspects, the UE 120 may determine that no valid periodic or semi-persistent (P/SP) CSI-RS was detected in the previous CSI-RS period. This may occur in cases when no channel access operation of the BS 110 was successful, when the UE 120 detects no CSI-RS that satisfies a measurement threshold, or the like. In such a case, in some aspects, the UE 120 may transmit no CSI report. For example, if the CSI report is provided in a physical uplink control channel (PUCCH), then the UE 120 may skip the PUCCH. If the CSI report is provided in a physical uplink shared channel (PUSCH), then the UE 120 may include no CSI report information in the PUSCH. In some aspects, the UE 120 may transmit a CSI report regarding a CSI-RS that was measured in a previous CSI-RS period. In this case, the CSI report may indicate at least one of the CSI period for which the CSI report is being provided, or a CSI-RS resource or transmit opportunity associated with the CSI-RS within the CSI period. In some aspects, the UE 120 may provide an indication, in the CSI report, that the UE 120 did not receive a valid CSI-RS.

As shown by reference number 360, in some aspects, including optional implementations, the UE 120 may rate match a shared channel around one or more CSI-RS resources. For example, the BS 110 may transmit a grant for a shared channel (such as a physical downlink shared channel (PDSCH)) to the UE 120. The UE 120 and the BS 110 may rate match the shared channel around one or more CSI-RS resources, thereby preventing collisions between the CSI-RS resources and the shared channel and preserving the throughput of the shared channel.

In some aspects, the UE 120 may rate match around a zero-power (ZP) CSI-RS. A ZP-CSI-RS may be used to enforce rate matching around a non-ZP (NZP) CSI-RS resource that may be used for CSI reporting. For example, the BS 110 may configure multiple ZP-CSI-RS resources in a period, so that the shared channel is rate matched around the NZP-CSI-RS resources that may be used for CSI reporting. Not all of the configured ZP-CSI-RS resources may be valid for all UEs, since multiple CSI-RS resources are configured for robustness against channel access failures. Various rate matching techniques for multiple ZP-CSI-RS resources are described in turn below.

In a first option (referred to herein as Option 1), the UE 120 may rate match around all configured ZP-CSI-RS resources in a CSI-RS period, irrespective of which CSI-RS resource is actually valid. This may conserve processing or signaling power that would otherwise be used to determine or signal which CSI-RS resources are to be rate matched around.

In a second option (referred to herein as Option 2), the UE 120 may rate match around only the first ZP-CSI-RS resource configured in a CSI-RS period that is in a valid transmit opportunity (such as when the UE 120 detects the downlink burst of the CSI-RS period). As used herein, detecting the downlink burst may refer to detecting a grant that includes the CSI-RS period or detecting a COT-SI that identifies the CSI-RS period as a transmit opportunity. In this case, if the UE 120 does not detect the downlink burst, the UE 120 may rate match the shared channel around the next CSI-RS opportunity in the CSI-RS period.

In a third option (referred to herein as Option 3), the grant for the shared channel may include an explicit indication of whether the UE 120 is to rate match around the ZP-CSI-RS resource(s). This may conserve resources that would otherwise be used by the UE 120 to determine whether the UE 120 is to rate match, and may provide increased flexibility and higher throughput relative to an approach where rate matching is performed on all ZP-CSI-RS resources or the first valid ZP-CSI-RS resource in a transmit opportunity.

As shown by reference number 370, the UE 120 may transmit a CSI report based on the CSI-RS received from the BS. The CSI report may include CSI determined using the CSI-RS or other information associated with CSI.

In some aspects, like in the case when multiple CSI-RS resources are configured, the CSI report may include an indication of which of the CSI-RS resources was used to determine the CSI report. In some aspects, the CSI report may include an indication of the CSI-RS period in which the CSI-RS used to determine the CSI report was received. For example, a first value may indicate a current period, a second value may indicate a previous period (such as in case a CSI-RS was not detected in current period), and so on. In some aspects, the CSI report may include an indication of whether a CSI-RS was detected or whether the CSI report is valid. For example, the CSI report may be invalid if no CSI-RS was detected.

In some aspects, the UE 120 may be configured with multiple CSI report transmission opportunities. For example, each of the multiple CSI-RS resources may be associated with one or more CSI report transmission opportunities. As another example, each CSI-RS resource (on the downlink) may be associated with one or more PUCCH opportunities (on the uplink). In each direction (uplink and downlink), the BS 110 and the UE 120 may use a first resource or opportunity that is associated with a successful channel access operation. If the UE 120 misses a PUCCH opportunity, the UE 120 may use a next PUCCH opportunity. The UE 120 may indicate, in the CSI report, which CSI-RS is associated with the CSI report. In some aspects, configuration information for the CSI report may indicate one or more offsets for CSI reporting relative to CSI-RS resources.

Figure 4:
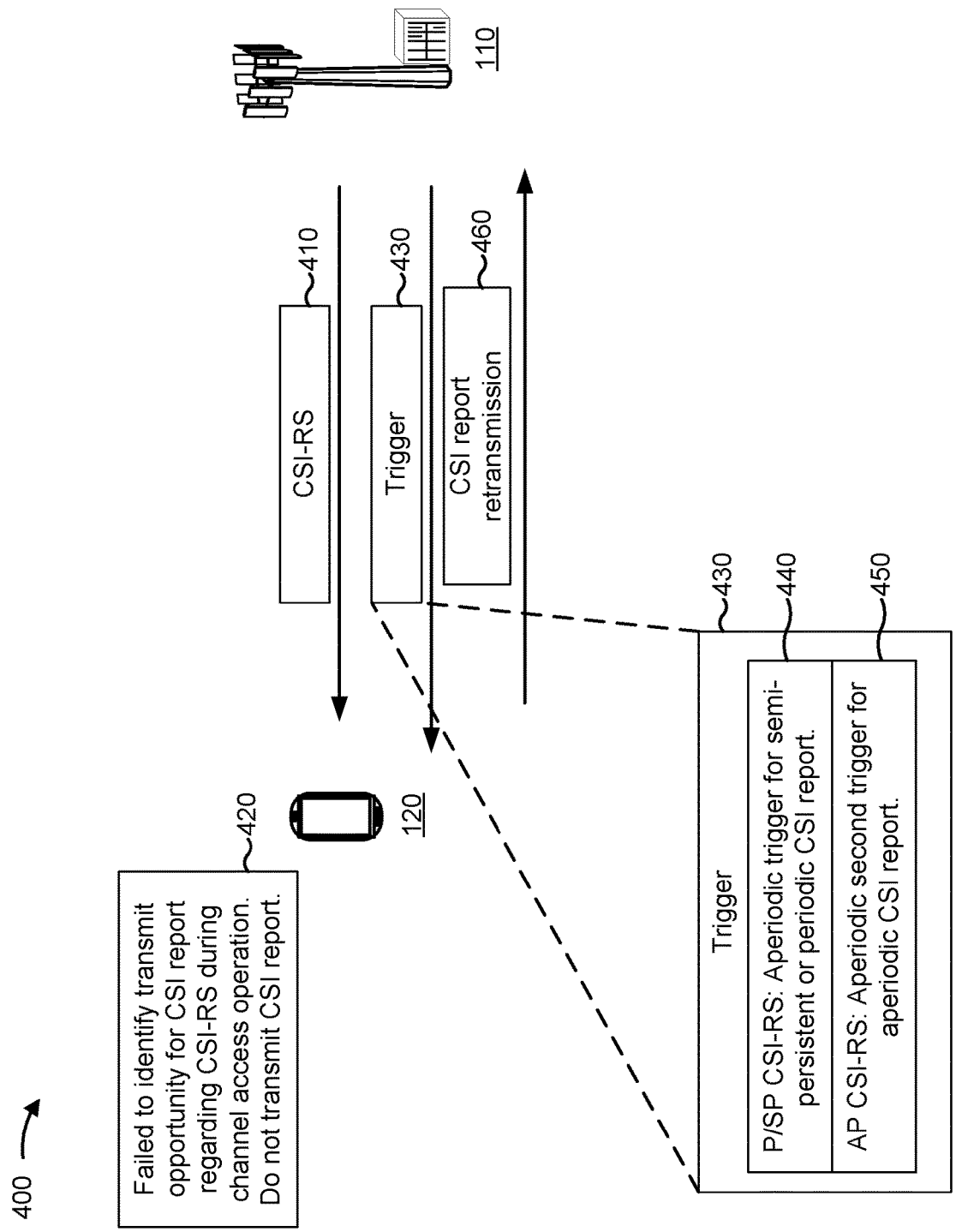
FIG. 4 is a diagram illustrating an example of triggering CSI report retransmission in an unlicensed spectrum.

FIG. 4 is a diagram illustrating an example 400 of triggering CSI report retransmission in an unlicensed spectrum. As shown, the example 400 includes a UE 120 and a BS 110.

As shown by reference number 410, the BS 110 may transmit a CSI-RS to the UE 120, which is described in more detail in connection with FIG. 3. As shown by reference number 420, the UE 120 may fail to identify a transmit opportunity for a CSI report regarding the CSI-RS. For example, the UE 120 may fail channel access operations associated with multiple CSI reporting opportunities. In some aspects, the UE 120 may fail channel access operations for all CSI reporting opportunities of the UE 120. Thus, the UE 120 may not transmit the CSI report. In some aspects, the UE 120 may transmit the CSI report, and the BS 110 may not receive the CSI report (for example, due to interference, higher-priority traffic preempting the CSI report, or another cause).

As shown by reference number 430, the BS 110 may provide a trigger to the UE 120 to trigger the UE 120 to retransmit the CSI report. For example, the BS 110 may provide the trigger based on determining that the CSI-RS was not received. Some possible implementations of the trigger are shown by reference numbers 440 and 450.

As shown by reference number 440, in some aspects, the trigger may relate to a periodic or semi-persistent (P/SP) CSI report. For example, the trigger may be an aperiodic trigger for a P/SP CSI report. In this case, the UE 120 may continue to transmit P/SP CSI reports without receiving a trigger, and may transmit a triggered CSI report in connection with the trigger. In some aspects, the trigger may include an indication that the trigger is an aperiodic re-trigger pertaining to an unreceived CSI report, an indication of a P/SP CSI report configuration index or a CSI-RS resource configuration index for which the CSI report is triggered, an indication of a slot index of the P/SP CSI report or a slot index of the CSI-RS resource, an indication of whether the P/SP CSI-RS resource or the P/SP CSI report occasion occurred in a current period or a previous period, or an index of a period in which the P/SP CSI-RS resource or the P/SP CSI report occasion occurred. In some aspects, the trigger may be associated with a most recent past CSI report occasion, or a most recent past CSI report occasion in a current CSI-RS period.

In some aspects, the trigger may include an indication of uplink resources for transmission of the CSI report (such as a slot offset, frequency/time resources, or an indication of whether to use a PUCCH or a PUSCH). In some aspects, the trigger may include an indication of encoding information, such as a PUSCH modulation and coding scheme, a PUCCH format, or similar information. In some aspects, the trigger may include an indication of a channel access type for the CSI report transmission (for example, Category 2 or Category 4). In some aspects, if the UE 120 did not detect the CSI-RS in a slot indicated by the trigger, the UE 120 may provide an indication that the UE 120 did not detect the CSI-RS, may provide a CSI report from a previous period, or may not provide the CSI report.

As shown by reference number 450, in some aspects, the trigger may be an aperiodic second trigger (sometimes referred to as a re-trigger) for retransmission of an aperiodic CSI report. This may be used in the case when the BS 110 does not receive a previously-triggered CSI report (such as due to a channel access failure of the UE 120). In some aspects, the trigger may include an indication that the trigger is a second trigger (such as that the trigger is a second trigger for a previous AP-CSI-RS). In such a case, the CSI-RS associated with the second trigger may not be transmitted at the same slot offset as the previous AP-CSI-RS in the future. In some aspects, the trigger may include an indication of whether the CSI report for which the retransmission is triggered is an aperiodic CSI report, a periodic CSI report, or a semi-persistent CSI report. In some aspects, the trigger may include an indication of an aperiodic CSI report configuration or an aperiodic CSI-RS resource configuration for which the CSI report is triggered. In some aspects, the trigger may include an indication of a slot index of the CSI report for which the retransmission is triggered or a slot index of the CSI-RS to which the CSI report relates. In some aspects, the trigger may implicitly correspond to a most recent AP CSI report trigger that was transmitted. In some aspects, the trigger may indicate a channel access type for the retransmission.

In some aspects, the BS 110 may transmit the trigger based on a time constraint. For example, the time constraint may identify a maximum time limit between an original AP CSI reporting trigger and the trigger, or a maximum time limit between an original CSI report (such as a P, SP, or AP CSI report) slot for which transmission failed due to channel access and the trigger. If the UE 120 receives a second trigger after the time constraint has elapsed, the UE 120 may not perform the retransmission. This may reduce resource consumption at the UE 120 that would otherwise occur if the UE 120 stored CSI reporting information for an inordinate amount of time.

As shown by reference number 460, the UE 120 may retransmit the CSI report based on the trigger. For example, the UE 120 may retransmit the CSI report using a resource indicated by the trigger or a next available transmit occasion for the CSI report, among other examples.

Figure 5:
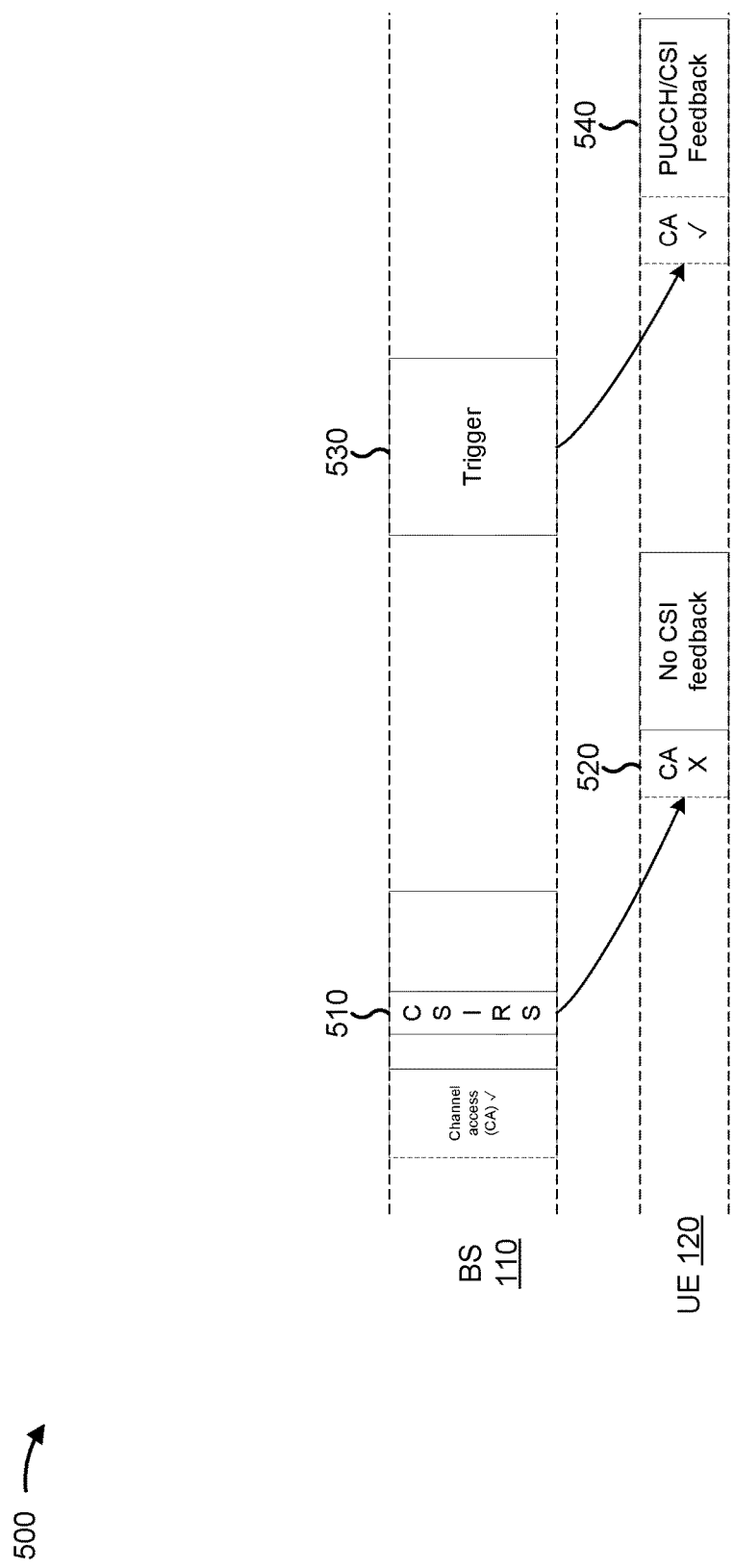
FIG. 5 is a diagram illustrating an example of triggering CSI report retransmission in an unlicensed spectrum.

FIG. 5 is a diagram illustrating an example 500 of triggering CSI report retransmission in an unlicensed spectrum. The top row in FIG. 5 shows operations performed by a BS 110, and the bottom row in FIG. 5 shows operations performed by a UE 120. As shown by reference number 510, the BS 110 may transmit a CSI-RS to the UE 120. As shown by reference number 520, the UE 120 may fail a channel access operation for CSI feedback associated with the CSI-RS, and may therefore not transmit the CSI feedback. Accordingly, as shown by reference number 530, the BS 110 may trigger retransmission of the CSI feedback using one or more of the techniques described in connection with FIG. 4. For example, the BS 110 may trigger the retransmission based at least in part on determining that the CSI feedback is not received at a time at which the CSI feedback is expected to arrive at the BS 110 As shown by reference number 540, upon receiving the trigger from the BS 110. the UE 120 transmits the CSI feedback on a PUCCH. In some cases, the trigger indicates PUSCH shared channel resources for the channel state feedback (CSF) retransmission (such as using an uplink grant), and the UE 120 may retransmit the CSI feedback on the PUSCH associated with the shared channel resources based on receiving the trigger.

Figure 6:
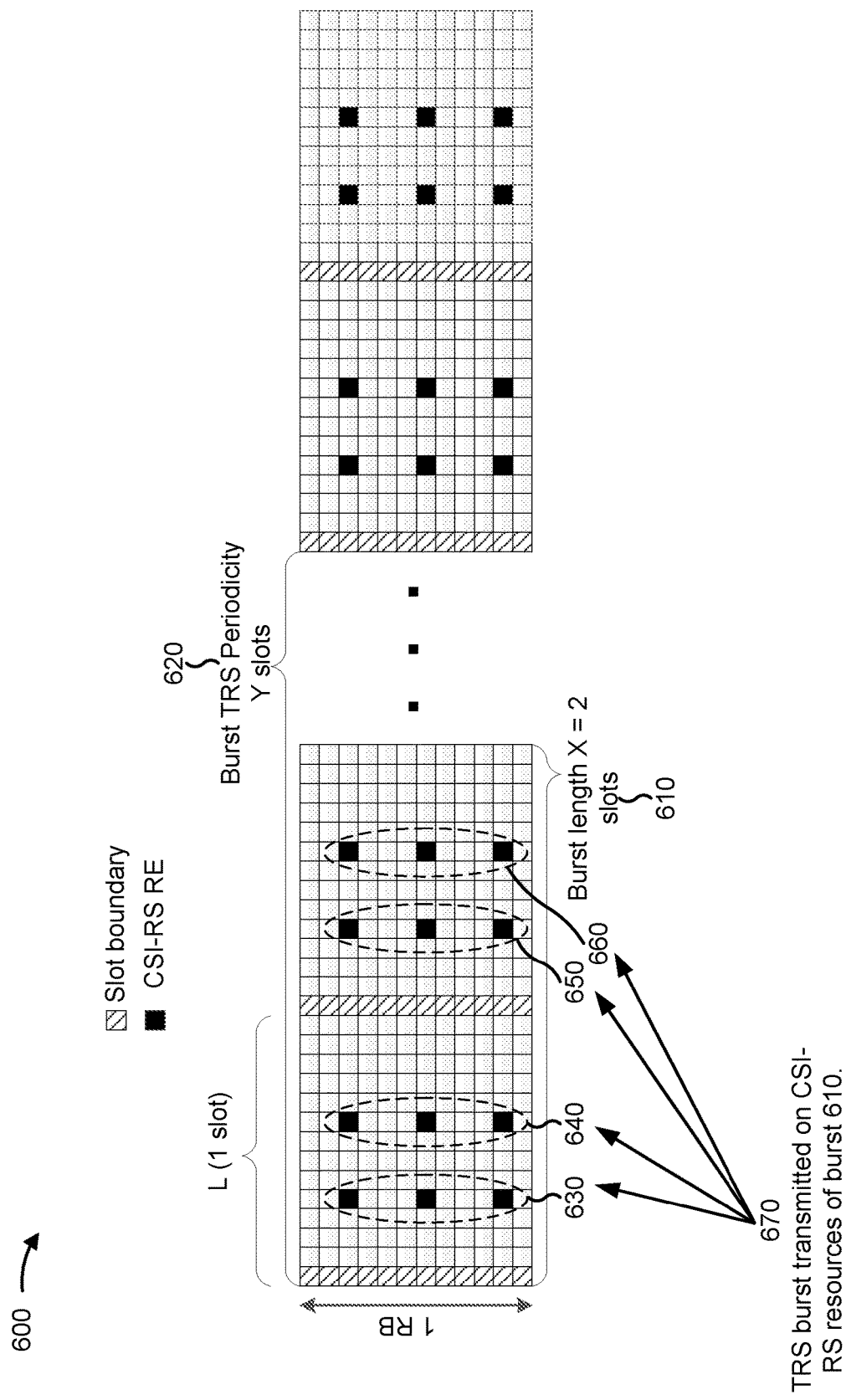
FIG. 6 is a diagram illustrating an example of a tracking reference signal (TRS) configuration using CSI reference signal resources.

FIG. 6 is a diagram illustrating an example 600 of a tracking reference signal (TRS) configuration using CSI-RS resources. The TRS may be transmitted in a burst 610 with a length of X slots (here, X=2), where the length of a slot is shown by L. CSI-RS resource elements (which may be used to transmit the TRS) are shown using a black fill, and slot boundaries of the slots are shown with a diagonal fill. As shown, the burst may have a TRS periodicity 620 of Y slots (Y being an integer number). The TRS configuration shown in FIG. 6 may be configured as a CSI resource set having multiple CSI-RS resources. For example, the example 600 includes 4 CSI-RS resources 630, 640, 650, 660 in the burst 610. As shown by reference number 670, a TRS burst may include CSI-RS resources 630, 640, 650, 660 configured in 4 symbols of two consecutive slots.

Figure 7:
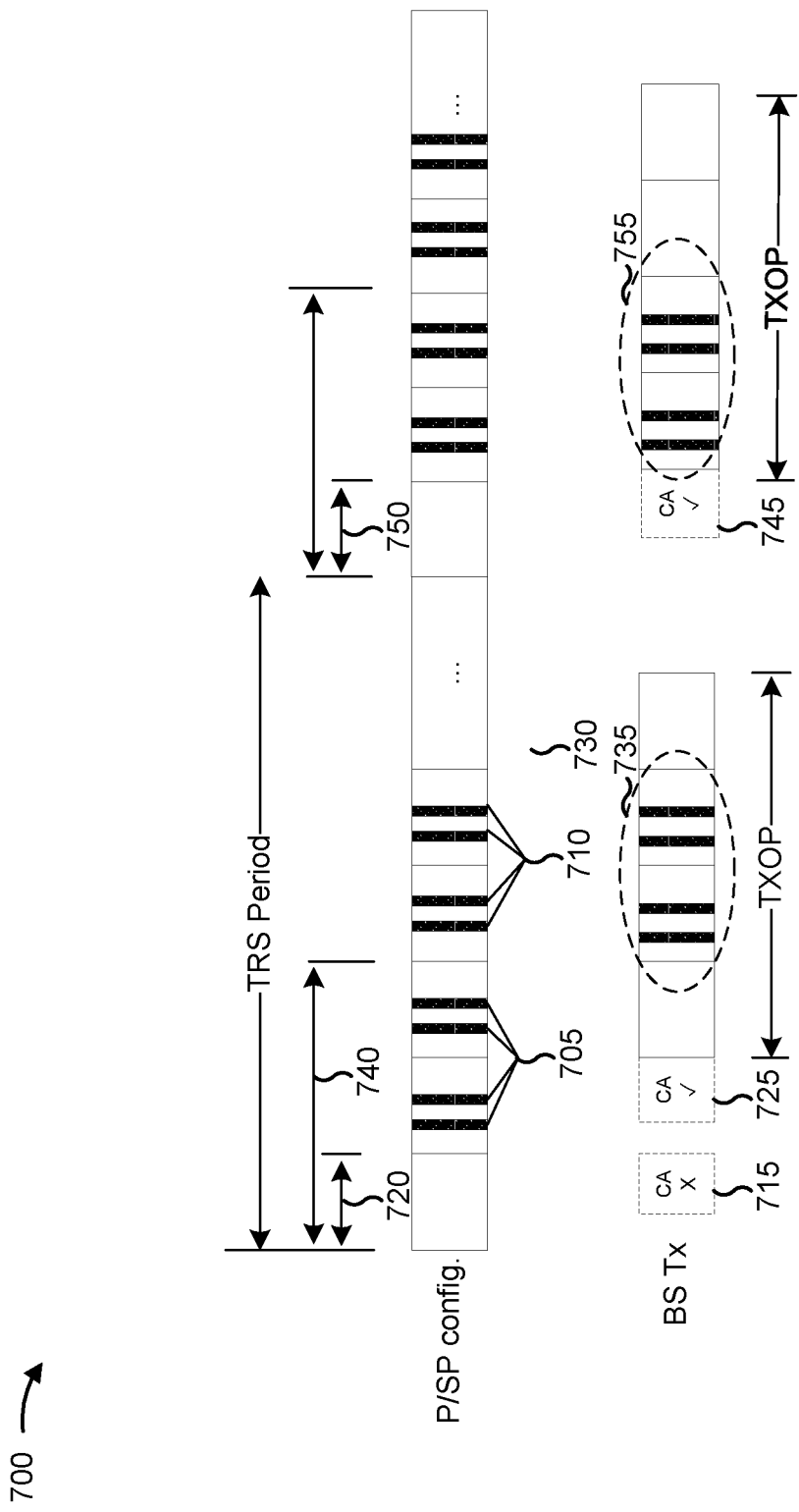
FIG. 7 is a diagram illustrating an example of TRS transmission based on a transmit opportunity of a transmitter of the TRS.

FIG. 7 is a diagram illustrating an example 700 of TRS transmission based on a transmit opportunity of a transmitter of the TRS. Examples of the CSI-RS resources that may be used to transmit the TRS are shown by reference numbers 705 and 710. The CSI-RS resources that may be used to transmit the TRS are generally shown by a black fill.

In example 700, the TRS burst will be transmitted only if all CSI-RS resources of the TRS burst are included in a transmit opportunity. In other words, if any CSI-RS resource of the 2-slot TRS burst is outside of a transmit opportunity, such as due to a channel access failure or a maximum channel occupancy time (MCOT) regulation, the TRS burst will not be transmitted. If the BS 110 triggers an aperiodic TRS transmission, the BS 110 may trigger the transmission so that all resources in the TRS burst fall within a transmit opportunity.

As shown by reference number 715, the BS 110 performs a first channel access operation based on a first slot offset 720 and fails. Accordingly, the BS 110 performs a second channel access operation, shown by reference number 725, and secures the transmit opportunity shown by reference number 730. As shown by reference number 735, the BS 110 then transmits the TRS burst during the transmit opportunity and in accordance with a second slot offset 740. In the second part of the example, the first channel access operation 745 associated with the first slot offset 750 is successful, and the BS 110 transmits the TRS burst 755 after the first slot offset 750.

Figure 8:
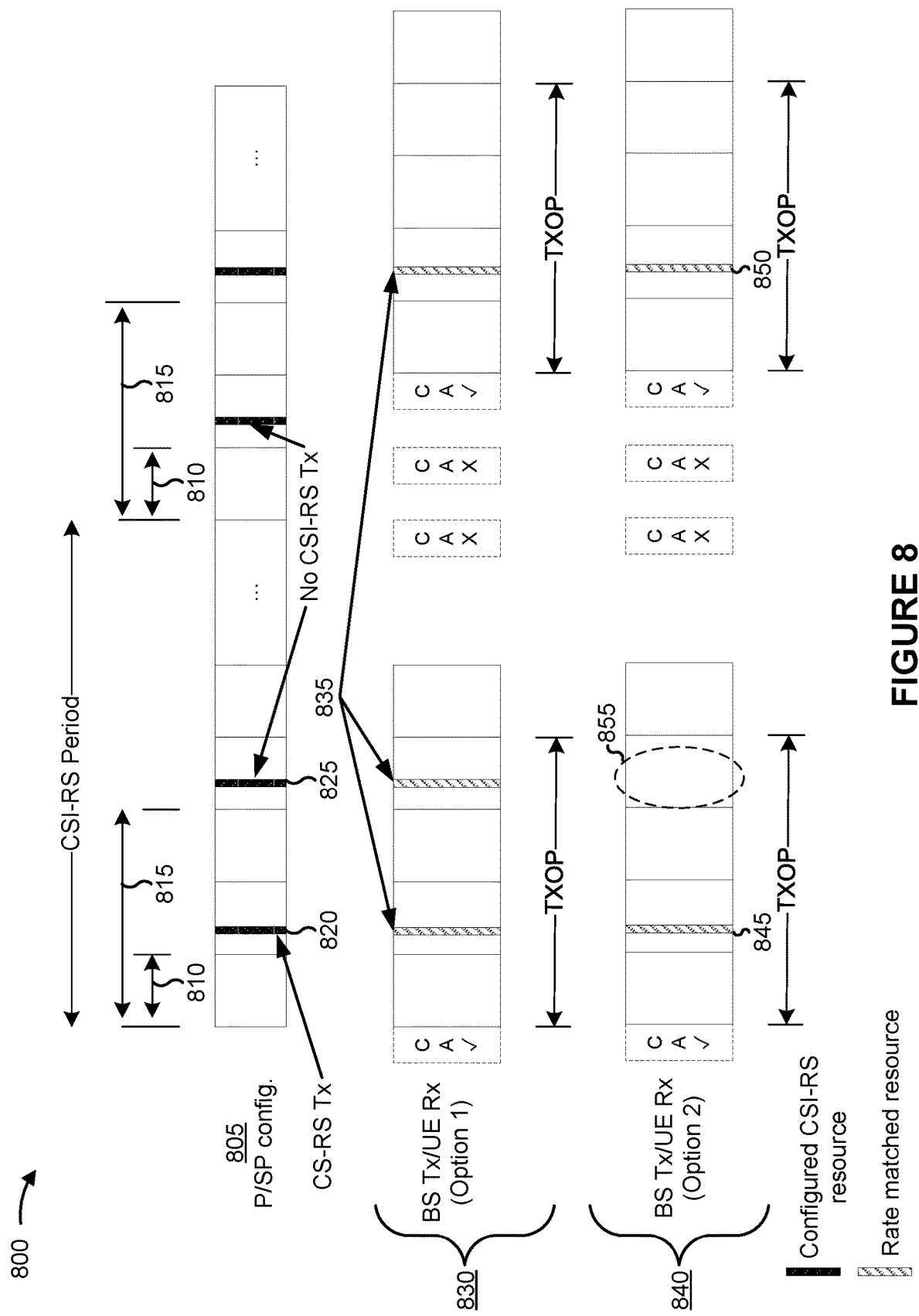
FIG. 8 is a diagram illustrating an example of rate matching configurations for zero-power CSI reference signals.

FIG. 8 is a diagram illustrating an example 800 of rate matching configurations for zero-power CSI reference signals. A P/SP CSI-RS resource configuration is shown by reference number 805. First and second slot offsets for ZP CSI-RSs are shown by reference numbers 810 and 815. Configured CSI-RS resources for the periodic ZP CSI-RSs are shown by reference numbers 820 and 825. As shown in the example 800, a CSI-RS is transmitted on the configured CSI-RS resource shown by reference number 820, and no CSI-RS is transmitted on the configured CSI-RS resource shown by reference number 825. The configured CSI resources, shown by a dotted fill, are aligned with the BS/UE timelines shown by reference numbers 830 and 840.

Option 1, described in connection with reference number 360 of FIG. 3, is indicated by reference number 830. In Option 1, the UE 120 and the BS 110 rate match around all ZP-CSI-RS resources, irrespective of whether the ZP-CSI-RS resource carries a CSI-RS. This is shown by reference number 835. As illustrated in Option 1, the UE 120 and the BS 110 rate match around the configured CSI-RS resources shown by reference numbers 820 and 825, even though no CSI-RS is transmitted on the configured CSI-RS resource shown by reference number 825.

Option 2, described in connection with reference number 360 of FIG. 3, is indicated by reference number 840. In Option 2, the UE 120 and the BS 110 rate match around only the first ZP-CSI-RS resource in a transmit opportunity. The rate-matched resources for Option 2 are shown by reference numbers 845 and 850. Note that, in option 2, the UE 120 and the BS 110 do not rate match around the resource 855 corresponding to the CSI-RS resource 825 in the first CSI-RS period, since no CSI-RS is transmitted on the CSI-RS resource 825 in the first CSI-RS period. Option 3, described in connection with reference number 360 of FIG. 3, is not shown in example 800.

FIG. 9 is a diagram illustrating an example process 900 performed, for example, by a UE. The example process 900 shows where a UE, such as UE 120, performs operations associated with CSI reporting for the unlicensed spectrum.

As shown in FIG. 9, in some aspects, the process 900 may include receiving configuration information for a channel state information reference signal (CSI-RS), where the configuration information indicates a plurality of CSI-RS resources (block 910). For example, the UE or an interface of the UE (such as using antenna 252, DEMOD 254, MIMO detector 256, receive processor 258, or controller/processor 280) may receive configuration information for a CSI-RS. The configuration information may indicate a plurality of CSI-RS resources, as described above.

As further shown in FIG. 9, in some aspects, the process 900 may include determining whether the CSI-RS is received on the plurality of CSI-RS resources based on the configuration information (block 920). For example, the UE or an interface of the UE (such as using controller/processor 280) may determine whether the CSI-RS is received on the plurality of CSI-RS resources based on the configuration information, as described above.

As further shown in FIG. 9, in some aspects, the process 900 may include selectively transmitting a CSI report based on whether the CSI-RS is received (block 930). For example, the UE or an interface of the UE (such as using controller/processor 280, transmit processor 264, TX MIMO processor 266, MOD 254, or antenna 252) may selectively transmit a CSI report based on whether the CSI-RS is received, as described above.

The process 900 may include additional aspects, such as any single aspect or any combination of aspects described below or in connection with one or more other processes described elsewhere herein.

In a first aspect, determining whether the CSI-RS is received further includes identifying a CSI-RS resource, of the plurality of CSI-RS resources, on which the CSI-RS is received based on a measurement of the plurality of CSI-RS resources.

In a second aspect, alone or in combination with the first aspect, determining whether the CSI-RS is received further includes identifying a CSI-RS resource, of the plurality of CSI-RS resources, on which the CSI-RS is received based on the CSI-RS resource being associated with a measurement value that satisfies a threshold.

In a third aspect, alone or in combination with one or more of the first and second aspects, the CSI-RS resource is an earliest CSI-RS resource, of the plurality of CSI-RS resources, that is associated with the measurement value that satisfies the threshold.

In a fourth aspect, alone or in combination with one or more of the first through third aspects, determining whether the CSI-RS is received is based on decoding information indicating that a CSI-RS resource of the plurality of CSI-RS resources is included in a TXOP.

In a fifth aspect, alone or in combination with one or more of the first through fourth aspects, the UE may determine whether the CSI-RS is received based on the information indicating the CSI-RS resource.

In a sixth aspect, alone or in combination with one or more of the first through fifth aspects, the plurality of CSI-RS resources are associated with a tracking reference signal (TRS) burst, where the TRS burst is received when all CSI-RS resources, of the plurality of CSI-RS resources, are included in a transmit opportunity of a base station that transmits the TRS burst.

In a seventh aspect, alone or in combination with one or more of the first through sixth aspects, when the CSI-RS is not received, selectively transmitting the CSI report further includes skipping transmission of the CSI report.

In an eighth aspect, alone or in combination with one or more of the first through seventh aspects, when the CSI-RS is not received, the CSI report relates to a CSI-RS received before a time associated with the plurality of CSI-RS resources.

In a ninth aspect, alone or in combination with one or more of the first through eighth aspects, when the CSI-RS is not received, the CSI report indicates that the CSI-RS is not received.

In a tenth aspect, alone or in combination with one or more of the first through ninth aspects, the CSI report is transmitted with information identifying at least one of: an indication of which CSI-RS resource is associated with the CSI report, an indication of a CSI period associated with the CSI report, or an indication of whether the CSI report is valid.

In an eleventh aspect, alone or in combination with one or more of the first through tenth aspects, the UE may receive a grant for a shared channel that overlaps at least one CSI-RS resource of the plurality of CSI-RS resources, and rate match the shared channel around the at least one CSI-RS resource.

In a twelfth aspect, alone or in combination with one or more of the first through eleventh aspects, the at least one CSI-RS resource is for a zero-power CSI-RS, and rate matching the shared channel around the at least one CSI-RS resource further includes rate matching the shared channel around one or more CSI-RS resources that overlap the shared channel.

In a thirteenth aspect, alone or in combination with one or more of the first through twelfth aspects, the at least one CSI-RS resource is for a zero-power CSI-RS, and rate matching the shared channel around the at least one CSI-RS resource further includes rate matching the shared channel around a first CSI-RS resource of the at least one CSI-RS resource that is included in a transmit opportunity.

In a fourteenth aspect, alone or in combination with one or more of the first through thirteenth aspects, the grant includes an indication of whether to rate match the shared channel around the at least one CSI-RS resource.

In a fifteenth aspect, alone or in combination with one or more of the first through fourteenth aspects, the UE may receive a trigger for a retransmission of the CSI report, where the trigger identifies the CSI report and where the CSI report is a periodic CSI report or a semi-persistent CSI report. The UE may perform the retransmission of the CSI report in accordance with the trigger.

In a sixteenth aspect, alone or in combination with one or more of the first through fifteenth aspects, the trigger includes an indication that the trigger is an aperiodic retransmission trigger for the CSI report.

In a seventeenth aspect, alone or in combination with one or more of the first through sixteenth aspects, the trigger includes an indication of at least one of an index to a CSI report configuration or an index to a CSI-RS resource configuration for which the retransmission of the CSI report is to be triggered.

In an eighteenth aspect, alone or in combination with one or more of the first through seventeenth aspects, the trigger includes an indication of at least one of a slot index of the CSI report or a slot index of a CSI-RS resource, of the plurality of CSI-RS resources, on which the CSI-RS was received.

In a nineteenth aspect, alone or in combination with one or more of the first through eighteenth aspects, the trigger includes an indication of at least one of: an uplink resource for the retransmission of the CSI report, encoding information for the retransmission of the CSI report, or a channel access type for the retransmission of the CSI report.

In a twentieth aspect, alone or in combination with one or more of the first through nineteenth aspects, the trigger includes an indication of whether the CSI report for which the retransmission is triggered is an aperiodic CSI report, a periodic CSI report, or a semi-persistent CSI report.

In a twenty-first aspect, alone or in combination with one or more of the first through twentieth aspects, the trigger identifies the CSI report for which the retransmission is triggered.

In a twenty-second aspect, alone or in combination with one or more of the first through twenty-first aspects, performing the retransmission of the CSI report in accordance with the trigger further includes performing the retransmission based on a maximum time limit between the trigger and a previous trigger for the CSI report.

In a twenty-third aspect, alone or in combination with one or more of the first through twenty-second aspects, determining whether the CSI-RS is received further includes identifying a CSI-RS resource, of the plurality of CSI-RS resources, on which the CSI-RS is received based on the CSI-RS resource having a signal strength value that satisfies a threshold.

In a twenty-fourth aspect, alone or in combination with one or more of the first through twenty-third aspects, the signal strength value is a maximum signal strength value.

In a twenty-fourth aspect, alone or in combination with one or more of the first through twenty-third aspects, the process 900 includes determining Out-Of-Sync or In-Sync metrics when the signal strength value satisfies the threshold.

Although FIG. 9 shows example blocks of the process 900, in some aspects, the process 900 may include additional blocks, fewer blocks, different blocks, or differently arranged blocks than those depicted in FIG. 9. Additionally, or alternatively, two or more of the blocks of the process 900 may be performed in parallel.

Figure 10:
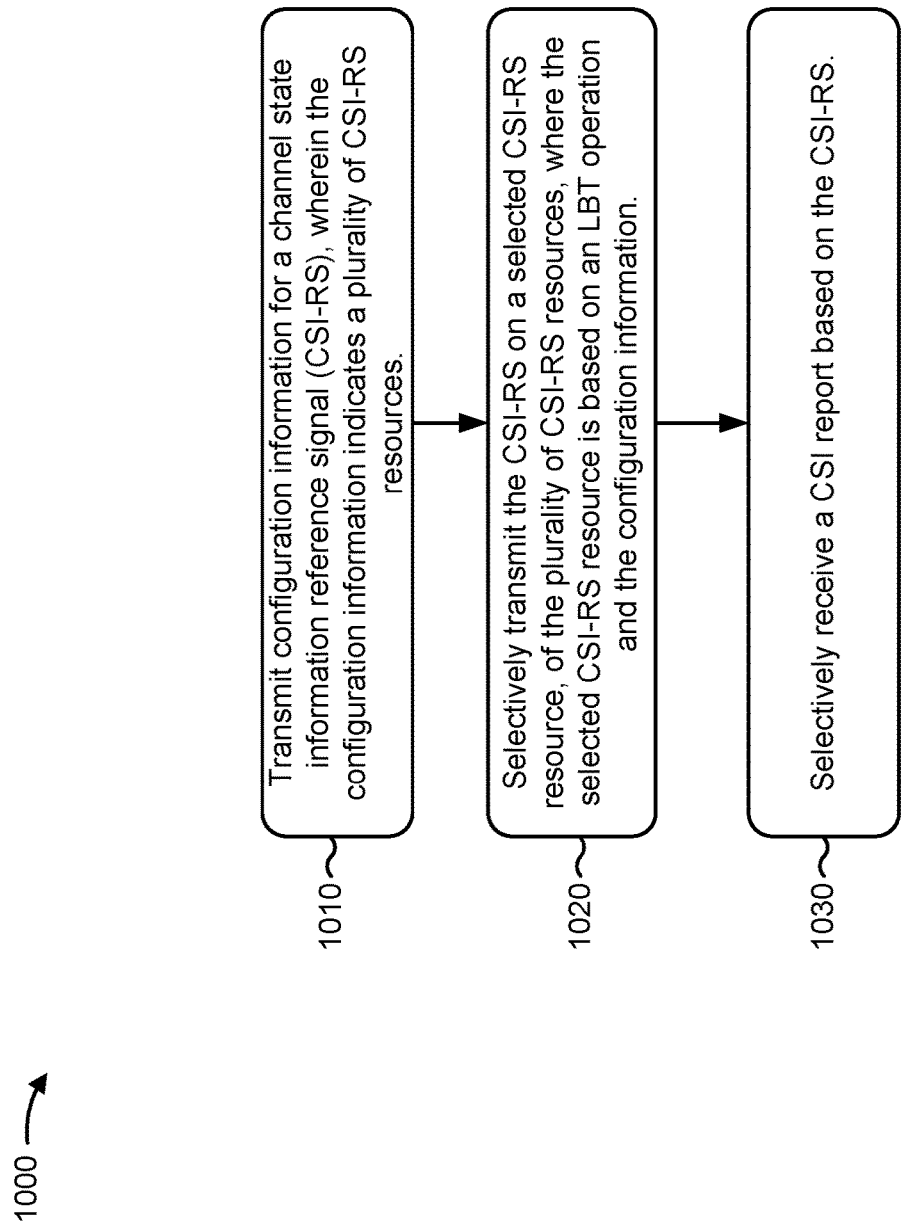
FIG. 10 is a diagram illustrating an example process performed, for example, by a BS.

FIG. 10 is a diagram illustrating an example process 1000 performed, for example, by a BS. The example process 1000 shows where a base station, such as base station 110, performs operations associated with CSI configuration and reporting for the unlicensed spectrum.

As shown in FIG. 10, in some aspects, the process 1000 may include transmitting configuration information for a channel state information reference signal (CSI-RS), where the configuration information indicates a plurality of CSI-RS resources (block 1010). For example, the base station or an interface of the base station (such as using controller/processor 240, transmit processor 220, TX MIMO processor 230, MOD 232, or antenna 234) may transmit configuration information for a CSI-RS, as described above. The configuration information may indicate a plurality of CSI resources.

As further shown in FIG. 10, in some aspects, the process 1000 may include selectively transmitting the CSI-RS on a selected CSI-RS resource, of the plurality of CSI-RS resources, where the selected CSI-RS resource is based on a channel access operation and the configuration information (block 1020). For example, the base station or an interface of the base station (such as using controller/processor 240, transmit processor 220, TX MIMO processor 230, MOD 232, or antenna 234) may selectively transmit the CSI-RS on a selected CSI-RS resource, of the plurality of CSI-RS resources, as described above. In some aspects, the selected CSI-RS resource is based on a channel access operation and the configuration information. For example, the selected CSI resource may be selected from the plurality of CSI resources identified by the configuration information As further shown in FIG. 10, in some aspects, the process 1000 may include selectively receiving a CSI report based on the CSI-RS (block 1030). For example, the base station or an interface of the base station (such as using antenna 234, DEMOD 232, MIMO detector 236, receive processor 238, or controller/processor 240) may selectively receive a CSI report based on the CSI-RS, as described above. In some aspects, the base station may selectively receive a CSI report based on whether the CSI-RS is received by the UE, as described above.

The process 1000 may include additional aspects, such as any single aspect or any combination of aspects described below or in connection with one or more other processes described elsewhere herein.

In a first aspect, the base station may transmit information indicating that the selected CSI-RS resource of the CSI-RS is included in the transmit opportunity based on a success of the channel access operation.

In a second aspect, alone or in combination with the first aspect, the base station may transmit information indicating the selected CSI-RS resource.

In a third aspect, alone or in combination with one or more of the first and second aspects, the plurality of CSI-RS resources are associated with a TRS burst, and the TRS burst is transmitted when all CSI-RS resources, of the plurality of CSI-RS resources, are included in a transmit opportunity of the base station.

In a fourth aspect, alone or in combination with one or more of the first through third aspects, when the CSI-RS is not transmitted based on a failure of the channel access operation, the CSI report is not received.

In a fifth aspect, alone or in combination with one or more of the first through fourth aspects, when the CSI-RS is not transmitted, the CSI report relates to a CSI-RS transmitted before the plurality of CSI-RS resources.

In a sixth aspect, alone or in combination with one or more of the first through fifth aspects, when the CSI-RS is not transmitted, the CSI report indicates that the CSI-RS is not received by a user equipment.

In a seventh aspect, alone or in combination with one or more of the first through sixth aspects, the CSI report is received with information identifying at least one of: an indication of which CSI-RS resource is associated with the CSI report, an indication of a CSI period associated with the CSI report, or an indication of whether the CSI report is valid.

In an eighth aspect, alone or in combination with one or more of the first through seventh aspects, the base station may transmit a grant for a shared channel that overlaps at least one CSI-RS resource of the plurality of CSI-RS resources, and rate match the shared channel around the at least one CSI-RS resource.

In a ninth aspect, alone or in combination with one or more of the first through eighth aspects, the at least one CSI-RS resource is for a zero-power CSI-RS. Rate matching the shared channel around the at least one CSI-RS resource may further include rate matching the shared channel around one or more CSI-RS resources that overlap the shared channel.

In a tenth aspect, alone or in combination with one or more of the first through ninth aspects, the at least one CSI-RS resource is for a zero-power CSI-RS. In some aspects, rate matching the shared channel around the at least one CSI-RS resource may further include rate matching the shared channel around a first CSI-RS resource of the at least one CSI-RS resource that is included in a TXOP.

In an eleventh aspect, alone or in combination with one or more of the first through tenth aspects, the grant includes an indication of whether to rate match the shared channel around the at least one CSI-RS resource.

In a twelfth aspect, alone or in combination with one or more of the first through eleventh aspects, the base station may transmit a trigger for a retransmission of the CSI report, where the trigger identifies the CSI report and where the CSI report is a periodic CSI report or a semi-persistent CSI report. The base station may receive the retransmission of the CSI report in accordance with the trigger.

In a thirteenth aspect, alone or in combination with one or more of the first through twelfth aspects, the trigger includes an indication that the trigger is an aperiodic retransmission trigger for the CSI report.

In a fourteenth aspect, alone or in combination with one or more of the first through thirteenth aspects, the trigger includes an indication of at least one of an index to a CSI report configuration or an index to a CSI-RS resource configuration for which the retransmission of the CSI report is to be triggered.

In a fifteenth aspect, alone or in combination with one or more of the first through fourteenth aspects, the trigger includes an indication of at least one of a slot index of the CSI report or a slot index of a CSI-RS resource, of the plurality of CSI-RS resources, on which the CSI-RS was received.

In a sixteenth aspect, alone or in combination with one or more of the first through fifteenth aspects, the trigger includes an indication of at least one of: an uplink resource for the retransmission of the CSI report, encoding information for the retransmission of the CSI report, or a channel access type for the retransmission of the CSI report.

In a seventeenth aspect, alone or in combination with one or more of the first through sixteenth aspects, the trigger includes an indication of whether the CSI report for which the retransmission is triggered is an aperiodic CSI report, a periodic CSI report, or a semi-persistent CSI report.

In an eighteenth aspect, alone or in combination with one or more of the first through seventeenth aspects, the trigger identifies the CSI report for which the retransmission is triggered.

In a nineteenth aspect, alone or in combination with one or more of the first through eighteenth aspects, the trigger is transmitted based on a maximum time limit between the trigger and a previous trigger for the CSI report.

Although FIG. 10 shows example blocks of the process 1000, in some aspects, the process 1000 may include additional blocks, fewer blocks, different blocks, or differently arranged blocks than those depicted in FIG. 10. Additionally, or alternatively, two or more of the blocks of the process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed at a user equipment (UE), comprising:
   receiving configuration information that indicates a plurality of channel state information reference signal (CSI-RS) resources associated with a CSI-RS;
   using a measurement-based approach based on not receiving an explicit indication that indicates the CSI-RS was transmitted using one of the plurality of CSI-RS resources, wherein using the measurement-based approach comprises:
      measuring one or more CSI-RS resources of the plurality of CSI-RS resources; and
      selecting one of the plurality of CSI-RS resources based on the measurement of the one or more CSI-RS resources; and
   transmitting, based on a particular signal strength value of the selected one of the plurality of CSI-RS resources, a CSI report that includes channel state information (CSI) or other information associated with the CSI-RS.

2. The method of claim 1, further comprising:
   receiving the CSI-RS, wherein the CSI report is transmitted after receiving the CSI-RS.

3. The method of claim 1, wherein, when the CSI-RS is not received, the CSI report relates to another CSI-RS received by the UE before receiving the configuration information that indicates the plurality of CSI-RS resources.

4. The method of claim 1, wherein, when the CSI-RS is not received, the CSI report indicates that the CSI-RS is not received.

5. The method of claim 1, wherein the CSI report comprises at least one of:
   an indication that the selected one of the plurality of CSI-RS resources is associated with the CSI report,
   an indication of a CSI period associated with the CSI report, or
   an indication of whether the CSI report is valid.

6. The method of claim 1, further comprising:
   receiving a grant for a shared channel that overlaps at least one CSI-RS resource of the plurality of CSI-RS resources; and
   rate matching the shared channel around the at least one CSI-RS resource.

7. The method of claim 6, wherein the at least one CSI-RS resource is for a zero-power CSI-RS.

8. The method of claim 1, further comprising:
receiving a trigger for a retransmission of the CSI report, wherein the trigger identifies the CSI report as an aperiodic CSI report, a periodic CSI report, or a semi-persistent CSI report; and
performing the retransmission of the CSI report in accordance with the trigger.

9. The method of claim 8, wherein the trigger includes an indication that the trigger is an aperiodic retransmission trigger for the CSI report.

10. The method of claim 8, wherein the trigger includes an indication of at least one of:
an uplink resource for the retransmission of the CSI report,
encoding information for the retransmission of the CSI report, or
a channel access type for the retransmission of the CSI report.

11. The method of claim 8, wherein the trigger identifies the CSI report as the semi-persistent CSI report.

12. The method of claim 8, wherein performing the retransmission of the CSI report in accordance with the trigger further comprises performing the retransmission based on a maximum time limit associated with the trigger and a previous trigger for the CSI report.

13. An apparatus for wireless communication, comprising:
memory comprising instructions; and
one or more processors configured to execute the instructions and cause the apparatus to:
obtain configuration information that indicates a plurality of channel state information reference signal (CSI-RS) resources associated with a CSI-RS;
use a measurement-based approach based on not obtaining an explicit indication that indicates the CSI-RS was transmitted using one of the plurality of CSI-RS resources, wherein, to use the measurement-based approach, the one or more processors are configured to execute the instructions and cause the apparatus to:
measure one or more CSI-RS resources of the plurality of CSI-RS resources; and
select the one of the plurality of CSI-RS resources based on the measurement of the one or more CSI-RS resources; and
output, based on a particular signal strength value of the selected one of the plurality of CSI-RS resources, a CSI report that includes channel state information (CSI) or other information associated with the CSI-RS.

14. The apparatus of claim 13, wherein the one or more processors are configured to execute the instructions and cause the apparatus further to:
obtain the CSI-RS before outputting the CSI report.

15. The apparatus of claim 13,
wherein the configuration information further indicates that the CSI-RS is transmittable on the plurality of CSI-RS resources, and
wherein the configuration information identifies one or more slot offsets for resource allocations for the plurality of CSI-RS resources.

16. The apparatus of claim 13, wherein the explicit indication is a bitmap obtained via a common physical downlink control channel (PDCCH).

17. The apparatus of claim 13, wherein, when the CSI-RS has not been obtained, the CSI report relates to another CSI-RS obtained by the apparatus before the configuration information that indicates the plurality of CSI-RS resources is obtained.

18. The apparatus of claim 13, wherein, when the CSI-RS has not been obtained, the CSI report indicates that the CSI-RS has not been obtained.

19. The apparatus of claim 13, wherein the CSI report comprises at least one of:
an indication that the selected one of the plurality of CSI-RS resources is associated with the CSI report,
an indication of a CSI period associated with the CSI report, or
an indication of whether the CSI report is valid.

20. The apparatus of claim 13,
wherein the one or more processors are configured to execute the instructions and cause the apparatus further to:
obtain a grant for a shared channel that overlaps at least one CSI-RS resource of the plurality of CSI-RS resources; and
wherein the shared channel is rate matched around the at least one CSI-RS resource.

21. The apparatus of claim 20, wherein the at least one CSI-RS resource is for a zero-power CSI-RS.

22. The apparatus of claim 13, wherein the one or more processors are configured to execute the instructions and cause the apparatus further to:
obtain a trigger for a retransmission of the CSI report, wherein the trigger identifies the CSI report as an aperiodic CSI report, a periodic CSI report, or a semi-persistent CSI report; and
output, for retransmission, the CSI report in accordance with the trigger.

23. The apparatus of claim 22, wherein the trigger includes an indication that the trigger is an aperiodic retransmission trigger for the CSI report.

24. The apparatus of claim 22, wherein the trigger includes an indication of at least one of:
an uplink resource for the retransmission of the CSI report,
encoding information for the retransmission of the CSI report, or
a channel access type for the retransmission of the CSI report.

25. The apparatus of claim 22, wherein the trigger identifies the CSI report as the semi-persistent CSI report.

26. The apparatus of claim 22, wherein, to output, for retransmission, the CSI report in accordance with the trigger, the one or more processors are configured to execute the instructions and cause the apparatus to:
output, for retransmission, the CSI report based on a maximum time limit associated with the trigger and a previous trigger for the CSI report.

27. A user equipment (UE), comprising:
a transceiver;
memory comprising instructions; and
one or more processors configured to execute the instructions and cause the user equipment to:
receive, via the transceiver, configuration information that indicates a plurality of channel state information reference signal (CSI-RS) resources associated with a CSI-RS;
use a measurement-based approach based on not receiving an explicit indication that indicates the CSI-RS was transmitted using one of the plurality of CSI-RS resources, wherein, to use the measurement-based approach, the one or more processors are configured to execute the instructions and cause the user equipment to:
- measure one or more CSI-RS resources of the plurality of CSI-RS resources; and
- select the one of the plurality of CSI-RS resources based on the measurement of the one or more CSI-RS resources; and
- transmit, via the transceiver and based on a particular signal strength value of the selected one of the plurality of CSI-RS resources, a CSI report that includes channel state information (CSI) or other information associated with the CSI-RS.

28. The UE of claim 27,
wherein the configuration information further indicates that the CSI-RS is transmittable on the plurality of CSI-RS resources, and
wherein the configuration information identifies one or more slot offsets for resource allocations for the plurality of CSI-RS resources.

29. The UE of claim 27, wherein the explicit indication is a bitmap received via a common physical downlink control channel (PDCCH).

30. The UE of claim 27, wherein, when the CSI-RS is not received, the CSI report relates to another CSI-RS received by the UE before the configuration information that indicates the plurality of CSI-RS resources is obtained.

31. The UE of claim 27, wherein the particular signal strength value is a highest signal strength value of one or more signal strength values associated with the one or more CSI-RS resources or the particular signal strength value satisfies a signal strength threshold used for In-Sync metric evaluation.

32. The UE of claim 27, wherein the explicit indication is configured to be provided via a common physical downlink control channel (PDCCH) or a UE-specific PDCCH, and indicates whether one or more CSI-RSs were transmitted in a CSI-RS period.

33. The UE of claim 27, wherein the particular signal strength value is a highest signal strength value of one or more signal strength values associated with the one or more measured CSI-RS resources.

* * * * *